US012794558B2

(12) United States Patent
Shibata et al.

(10) Patent No.: US 12,794,558 B2
(45) Date of Patent: Nov. 10, 2026

(54) OPTICAL COMMUNICATION APPARATUS, OPTICAL COMMUNICATION SYSTEM AND TRANSMISSION METHOD

(71) Applicant: NTT, Inc., Tokyo (JP)

(72) Inventors: Naotaka Shibata, Musashino (JP); Shin Kaneko, Musashino (JP); Masahisa Kawashima, Musashino (JP)

(73) Assignee: NTT, Inc., Tokyo (JP)

( * ) Notice: Subject to any disclaimer, the term of this patent is extended or adjusted under 35 U.S.C. 154(b) by 242 days.

(21) Appl. No.: 18/699,923

(22) PCT Filed: Aug. 1, 2022

(86) PCT No.: PCT/JP2022/029466
§ 371 (c)(1),
(2) Date: Apr. 10, 2024

(87) PCT Pub. No.: WO2023/062915
PCT Pub. Date: Apr. 20, 2023

(65) Prior Publication Data
US 2024/0413907 A1 Dec. 12, 2024

(30) Foreign Application Priority Data
Oct. 12, 2021 (WO) .................. PCT/JP2021/037734

(51) Int. Cl.
*H04B 10/27* (2013.01)
*H04B 10/294* (2013.01)
*H04J 14/02* (2006.01)

(52) U.S. Cl.
CPC ........... *H04B 10/27* (2013.01); *H04B 10/294* (2013.01); *H04J 14/03* (2023.08)

(58) Field of Classification Search
CPC ....... H04B 10/27; H04B 10/294; H04J 14/03; H04J 14/0212; H04J 14/02;
(Continued)

(56) References Cited

U.S. PATENT DOCUMENTS 9,444,572 B2 * 9/2016 Kaneoka ............. H04J 14/0208
2010/0124391 A1 5/2010 Feuer et al.
(Continued)

FOREIGN PATENT DOCUMENTS

CN 105900363 A 8/2016
JP 2006-262018 A 9/2006
(Continued)

OTHER PUBLICATIONS

Ishii K et al: "Development of Hierarchical Optical Path Cross-Connect Systems Employing Wavelength/Waveband Selective Switches", Journal of Optical Communications and Networking, IEEE, USA, vol. 3, No. 7, Jul. 1, 2011 (Jul. 1, 2011), pp. 559-567, XP011360007, ISSN: 1943-0620, DOI:10.1364/JOCN.3.000559.
(Continued)

*Primary Examiner* — Hibret A Woldekidan
(74) *Attorney, Agent, or Firm* — Harness, Dickey & Pierce, P.L.C.

(57) ABSTRACT

An optical communication device includes: a plurality of first distribution units that is connected to a plurality of optical transmission lines and outputs an optical signal input from any of first devices to any of the optical transmission lines; a plurality of second distribution units that is connected to a plurality of optical transmission lines and outputs an optical signal input from any of the optical transmission lines to any of second devices; and a multicast transfer unit configured to perform multicast transfer of the optical signal transmitted from the first device connected to any of the plurality of first distribution units to any of the plurality of second distribution units connected to the one or more second devices.

3 Claims, 17 Drawing Sheets

(58) Field of Classification Search
CPC ....... H04Q 11/0005; H04Q 2011/0016; H04Q 2011/0058; H04Q 11/0001; H04Q 2011/0009; H04Q 2011/0011; H04Q 2011/0015; H04Q 2011/0047
See application file for complete search history.

(56) References Cited

U.S. PATENT DOCUMENTS

| | | | | |
|---|---|---|---|---|
| 2012/0020664 | A1 | 1/2012 | Sakurai et al. | |
| 2013/0216216 | A1 * | 8/2013 | Bottari | H04J 14/0295 398/5 |
| 2013/0322879 | A1 | 12/2013 | Wachter | |
| 2014/0161454 | A1 * | 6/2014 | Roorda | H04J 14/02126 398/68 |
| 2014/0270760 | A1 * | 9/2014 | Xu | H04J 14/0217 398/45 |
| 2014/0270761 | A1 | 9/2014 | Xu et al. | |
| 2015/0098700 | A1 | 4/2015 | Zhu et al. | |
| 2018/0084320 | A1 * | 3/2018 | Martinho | H04J 14/02126 |
| 2021/0021915 | A1 * | 1/2021 | Liu | H04L 69/326 |
| 2023/0030158 | A1 | 2/2023 | Kanai et al. | |
| 2024/0422457 | A1 * | 12/2024 | Shibata | H04B 10/27 |
| 2025/0240098 | A1 * | 7/2025 | Shibata | H04B 10/27 |

FOREIGN PATENT DOCUMENTS

| | | | | |
|---|---|---|---|---|
| JP | 2008-092536 | A | 4/2008 | |
| JP | 2010081374 | A | 4/2010 | |
| JP | 2016-527760 | A | 9/2016 | |
| JP | 2017157983 | A * | 9/2017 | H04B 10/27 |
| WO | WO-2014/201965 | A1 | 12/2014 | |
| WO | 2015/107466 | A1 | 7/2015 | |
| WO | WO-2015/107344 | A1 | 7/2015 | |
| WO | WO-2021/131202 | A1 | 7/2021 | |

OTHER PUBLICATIONS

Jun-ichi Kani et al., "Proposal to start the work to define Open APN Network Model, IOWN Global Forum", Jan. 13, 2022.
Jun-ichi Kani et al., "Proposed definition and implementation examples of the turnback module in APN-G", Feb. 2, 2022.
Junichi Kani, "Open APN Network Model", Feb. 10, 2022.
Masahisa Kawashima, "Turn-Back Use Cases and Support Levels", Mar. 1, 2022.
"Possible extension of Open ROADM models for end-to-end optical services", IOWN Global Forum, May 10, 2022.
Junichi Kani, "Open APN Network Model—Preliminary Study to Extend the Open ROADM Models", Feb. 10, 2022.

* cited by examiner

OPTICAL COMMUNICATION APPARATUS, OPTICAL COMMUNICATION SYSTEM AND TRANSMISSION METHOD

CROSS-REFERENCE TO RELATED APPLICATIONS

This application is a 371 U.S. National Phase of International Application No. PCT/JP2022/029466, filed on Aug. 1, 2022, which claims priority to International Application No. PCT/JP2021/037734, filed Oct. 12, 2021. The entire disclosures of the above applications are incorporated herein by reference.

TECHNICAL FIELD

The present invention relates to an optical communication device, an optical communication system, and a transfer method.

The present application claims priority on the basis of PCT/JP2021/037734 filed in Japan on Oct. 12, 2021, the contents of which are incorporated herein by reference.

BACKGROUND ART

There has been conventionally proposed an optical communication device capable of relaying an optical signal in accordance with a destination while reducing a delay (see, for example, Patent Literature 1). FIG. 16 illustrates a configuration example of an optical communication system 100 including a conventional optical communication device. The optical communication system 100 includes an optical SW 110 and a control unit 115 forming the optical communication device. The optical SW 110 is connected to subscriber devices 140-1 to 140-3.

The optical SW 110 is connected to a plurality of optical transmission lines and outputs an optical signal input from any of the optical transmission lines to another optical transmission line. The optical SW 110 of FIG. 16 includes first ports 111-1 to 111-6 and second ports 112-1 to 112-6. Each of the first ports 111 is connected to any of the subscriber devices 140-1 to 140-3 via any of optical transmission lines 135-1 to 135-3. Each of the second ports 112 is connected to optical transmission lines 136-1 to 136-4 or a return transmission line 137.

The return transmission line 137 is an optical transmission line for inputting an optical signal output from a certain port to another port. For example, in the example of FIG. 16, the return transmission line 137 is connected to the second port 112-4 and the second port 112-5. Therefore, for example, an optical signal output from the second port 112-4 can be input to the second port 112-5.

The control unit 115 is connected to the second port 112-6 of the optical SW 110 via the optical transmission line 136-4. The control unit 115 includes a wavelength management control unit 120 and an optical SW control unit 130. The wavelength management control unit 120 allocates a wavelength to the subscriber devices 140. The optical SW control unit 130 switches a path in the optical SW 110. In the example of FIG. 16, the optical SW control unit 130 switches the path in the optical SW 110 so as to connect the first port 111-2 to which the subscriber device 140-1 is connected and the second port 112-2, connect the first port 111-4 to which the subscriber device 140-2 is connected and the second port 112-4, and connect the first port 111-5 to which the subscriber device 140-3 is connected and the second port 112-5.

Therefore, an optical signal transmitted from the subscriber device 140-1 is input to the first port 111-2 of the optical SW 110 via the optical transmission line 135-1 and is output from the second port 112-2 of the optical SW 110 to the optical transmission line 136-2. An optical signal transmitted from the subscriber device 140-2 is input to the first port 111-4 of the optical SW 110 via the optical transmission line 135-2 and is output from the second port 112-4 of the optical SW 110 to the return transmission line 137. The optical signal output to the return transmission line 137 is input to the second port 112-5 of the optical SW 110 and is output from the first port 111-5 of the optical SW 110 to the optical transmission line 135-3. The optical signal output to the optical transmission line 135-3 is transmitted to the subscriber device 140-3.

As described above, low delay communication can be implemented by using the return transmission line 137 for the ports (e.g. the second ports 112) different from the ports (e.g. the first ports 111) to which the subscriber devices 140 are connected.

CITATION LIST

Patent Literature

Patent Literature 1: WO 2021/131202 A

SUMMARY OF INVENTION

Technical Problem

In the optical communication system 100 of FIG. 16, it is possible to increase the maximum number of users transmittable to each path by using a plurality of optical SWs 110-1 to 110-P (P is an integer of 2 or more) arranged in parallel in one base. FIG. 17 is an explanatory diagram of a configuration in which the plurality of optical SWs 110 is arranged in parallel. In the example of FIG. 17, the optical SWs 110-1 to 110-P are arranged in parallel, and each optical SW 110 is connected to the subscriber device 140.

In order to perform return communication between the subscriber device 140-1 connected to the optical SW 110-1 and the subscriber device 140-2 connected to the optical SW 110-2, it is necessary to connect the second port 112-1 of the optical SW 110-1 and the second port 112-1 of the optical SW 110-2 via the return transmission line 137. In a case where P optical SWs 110 are provided and each optical SW 110 houses n (n is an integer of 1 or more) subscriber devices 140, it is necessary to connect the return transmission lines 137 to one optical SW 110 by using n×(p−1) ports in order to connect each subscriber device 140 to an arbitrary subscriber device 140 at an arbitrary timing.

Each optical SW 110 requires n lines to communicate with the arbitrary subscriber device 140, and thus np ports are required in total between the SWs and in the SWs. It is conceivable to reduce the number of the return transmission lines 137 and physically change wiring every time when a connection request is received. However, this is not desirable because local operation increases. Therefore, there is a demand for a technique of eliminating the need for physical wiring and connecting each subscriber device to an arbitrary subscriber device at an arbitrary timing by using the number of return transmission lines smaller than before. Such a problem is not limited to an optical communication system including an optical SW and is a common problem in a case where return communication is performed in an optical communication system including an optical distribution unit having a function of distributing an input optical signal to another device.

In view of the above circumstances, an object of the present invention is to provide a technique capable of connecting each subscriber device to an arbitrary subscriber device at an arbitrary timing by using the number of return transmission lines smaller than before in a case where an optical communication system including a plurality of optical distribution units performs return communication.

Solution to Problem

One aspect of the present invention is an optical communication device including: a plurality of first distribution units that is connected to a plurality of optical transmission lines and outputs an optical signal input from any of first devices to any of the optical transmission lines; a plurality of second distribution units that is connected to a plurality of optical transmission lines and outputs an optical signal input from any of the optical transmission lines to an optical transmission line of any of second devices; and a multicast transfer unit configured to perform multicast transfer of the optical signal transmitted from the first device connected to any of the plurality of first distribution units to any of the plurality of second distribution units connected to the one or more second devices.

One aspect of the present invention is an optical communication system including: a plurality of first distribution units that is connected to a plurality of optical transmission lines and outputs an optical signal input from any of first devices to any of the optical transmission lines; a plurality of second distribution units that is connected to a plurality of optical transmission lines and outputs an optical signal input from any of the optical transmission lines to any of second devices; and a multicast transfer unit configured to perform multicast transfer of the optical signal transmitted from the first device connected to any of the plurality of first distribution units to any of the plurality of second distribution units connected to the one or more second devices.

One aspect of the present invention is a transfer method including: causing a plurality of first distribution units connected to a plurality of optical transmission lines to output an optical signal input from any of first devices to any of the optical transmission lines; causing a plurality of second distribution units connected to a plurality of optical transmission lines to output an optical signal input from any of the optical transmission lines to any of second devices; and performing multicast transfer of the optical signal transmitted from the first device connected to any of the plurality of first distribution units to any of the plurality of second distribution units connected to the one or more second devices.

Advantageous Effects of Invention

The present invention can connect each subscriber device to an arbitrary subscriber device at an arbitrary timing by using the number of return transmission lines smaller than before in a case where an optical communication system including a plurality of optical distribution units performs return communication.

DESCRIPTION OF EMBODIMENTS

Hereinafter, embodiments of the present invention will be described with reference to drawings.

Figure 1:
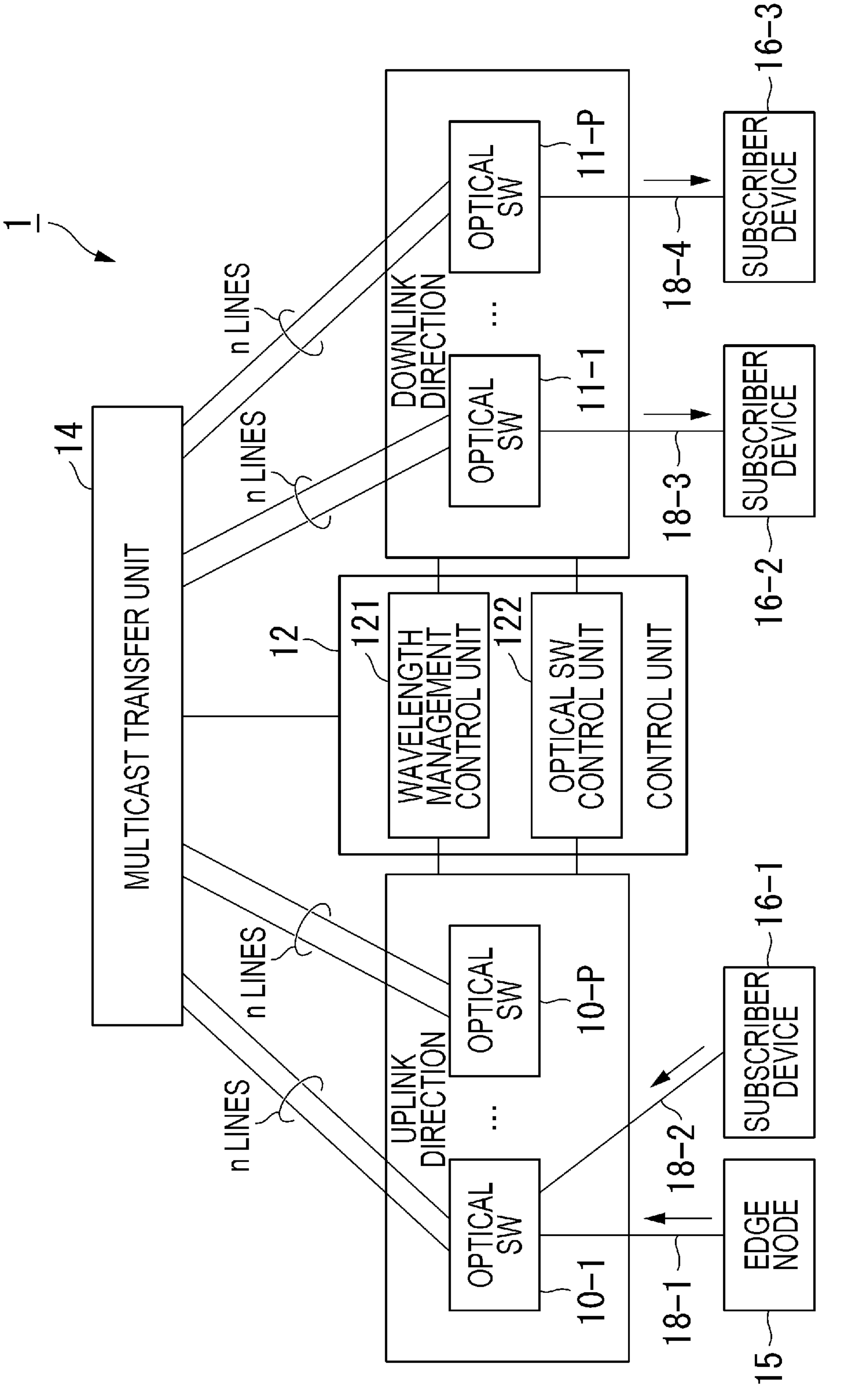
FIG. 1 is a configuration diagram of an optical communication system according to a first embodiment.

FIG. 1 is a configuration diagram of an optical communication system 1 according to a first embodiment. The optical communication system 1 includes P optical SWs 10-1 to 10-P (P is an integer of 2 or more), P optical SWs 11-1 to 11-P, a control unit 12, and a multicast transfer unit 14. Hereinafter, description will be made on the assumption that the optical SWs 10-1 to 10-P are used for transmitting optical signals in an uplink direction and that the optical SWs 11-1 to 11-P are used for transmitting optical signals in a downlink direction. In the following description, the optical SWs 10-1 to 10-P will be simply referred to as the optical SWs 10 when not distinguished, and the optical SWs 11-1 to 11-P will be simply referred to as the optical SWs 11 when not distinguished. The optical SWs 10, the optical SWs 11, the control unit 12, and the multicast transfer unit 14 are functional units forming one optical communication device.

The optical SW 10 is connected to a plurality of optical transmission lines and outputs an optical signal input from any of the optical transmission lines to another optical transmission line. The optical transmission lines are, for example, optical fibers. The optical SW 10 includes a plurality of first ports (e.g. n first ports) and a plurality of second ports (e.g. n or more second ports). Each first port of the optical SW 10 is connected to an edge node 15 or a subscriber device 16 via a transmission line 18. FIG. 1 illustrates an example where the edge node 15 is connected to the optical SW 10-1 via an optical transmission line 18-1, and a subscriber device 16-1 is connected thereto via an optical transmission line 18-2. The optical SW 10 is one aspect of a first optical distribution unit.

Among the plurality of second ports of the optical SW 10, n second ports are connected to the multicast transfer unit 14 via n optical transmission lines. Remaining second ports of the plurality of second ports of the optical SW 10 may be connected to another device via optical transmission lines. In the following description, the number of first ports and the number of second ports in the optical SW 10 are assumed to be n for simplicity of description.

The optical SW 11 is connected to a plurality of optical transmission lines and outputs an optical signal input from any of the optical transmission lines to another optical transmission line. The optical SW 11 includes a plurality of first ports (e.g. n first ports) and a plurality of second ports (e.g. n or more second ports). Each first port of the optical SW 11 is connected to the subscriber device 16 via the transmission line 18. FIG. 1 illustrates an example where a subscriber device 16-2 is connected to the optical SW 11-1 via an optical transmission line 18-2, and a subscriber device 16-3 is connected to the optical SW 11-P via an optical transmission line 18-3. The optical SW 11 is one aspect of a second optical distribution unit.

Among the plurality of second ports of the optical SW 11, n second ports are connected to the multicast transfer unit 14 via n optical transmission lines. Remaining second ports of the plurality of second ports of the optical SW 11 may be connected to another device via optical transmission lines. In the following description, the number of first ports and the number of second ports in the optical SW 11 are assumed to be n for simplicity of description.

The edge node 15 distributes a signal including predetermined information to the subscriber devices 16. The signal distributed by the edge node 15 is content such as a moving image. The edge node is one aspect of a first device.

The subscriber device 16 is connected to the optical SW 10 or 11 via an optical access network such as a passive optical network (PON). The subscriber device 16 includes an optical transceiver. The optical transceiver is an example of an optical transmission unit and an optical reception unit in the subscriber device 16. The optical transceiver is a wavelength-tunable optical transmitter/receiver. In this case, the subscriber device 16 can perform communication at an arbitrary wavelength. The optical transceiver may be an optical transceiver having an auxiliary management and control channel (AMCC) function. In this case, a wavelength used in the subscriber device 16 is controlled via a control signal superimposed by the AMCC. The subscriber device 16 is one aspect of a first device and a second device.

The control unit 12 is connected to the second port of each of the optical SWs 10 and 11 via an optical transmission line. The control unit 12 includes a wavelength management control unit 121 and an optical SW control unit 122. The wavelength management control unit 121 allocates a wavelength to the edge node 15 and each subscriber device 16. In a case where the wavelength management control unit 121 allocates a wavelength to the edge node 15 and each subscriber device 16, the optical SW control unit 122 switches a path between the ports of the optical SW 10 or 11 so as to connect the edge node 15 and the subscriber device 16 and the wavelength management control unit 121.

The optical SW control unit 122 switches connection between the ports of the optical SW 10 and connection between the ports of the optical SW 11. For example, the optical SW control unit 122 switches the connection between the ports of each of the optical SWs 10 and 11 such that the edge node 15 or the subscriber device 16 can communicate with a desired subscriber device 16. The optical SW control unit 122 is one aspect of an optical distribution control unit.

The control unit 12 stores a management table. The management table includes information for identifying the edge node 15 or the subscriber devices 16, information regarding a wavelength allocated to the edge node 15 and each subscriber device 16, and information regarding the optical SW 10 or 11 to which the edge node 15 or the subscriber device 16 is connected (e.g. information regarding a port to which the edge node 15 or the subscriber device 16 is connected). The control unit 12 includes one or more processors.

The multicast transfer unit 14 receives an optical signal output from the optical SW 10 as an input and performs multicast transfer of the input optical signal to at least the optical SW 11 to which a destination subscriber device 16 is connected. The n optical transmission lines are connected from one optical SW 10 to the multicast transfer unit 14, and thus nP uplink optical transmission lines are connected to the multicast transfer unit 14. The n optical transmission lines are connected from one optical SW 11 to the multicast transfer unit 14, and thus nP downlink optical transmission lines are connected to the multicast transfer unit 14.

In a case where multicast communication is performed across the optical SW 10, the optical SW control unit 122 switches a path between the ports of the optical SW 10 so as to connect an output destination of an optical signal from the optical SW 10 to the multicast transfer unit 14. The multicast transfer unit 14 performs control such that the input optical signal is output to a desired optical SW 11. With this configuration, return communication between arbitrary optical SWs is implemented while the number of wires required for return in each optical SW is suppressed to n. The present invention will be described by taking multicast communication as an example, but can also be applied to simple return communication. For example, the present invention is also applicable to a case where an optical signal transmitted from the subscriber device 16-1 connected to the optical SW 10 is transferred to the subscriber device 16 connected to the optical SW 11.

In a case where the multicast transfer unit 14 is implemented by one device, a wavelength selective switch (WSS) having nP×nP ports is used. However, in a case where nP is large, it is difficult to implement the WSS having nP×nP ports, which also leads to an increase in price. Therefore, hereinafter, a case where the multicast transfer unit 14 includes a plurality of devices will also be described.

Figure 2:
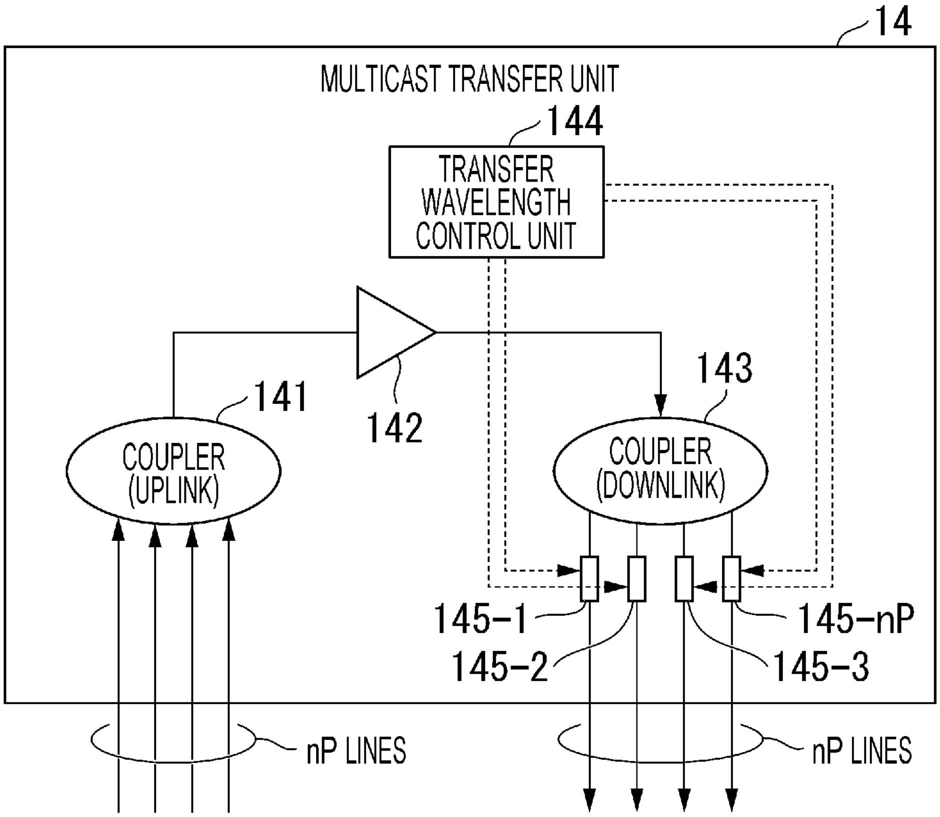
FIG. 2 is a block diagram illustrating a specific example of a functional configuration of a multicast transfer unit according to a first embodiment.

FIG. 2 is a block diagram illustrating a specific example of a functional configuration of the multicast transfer unit 14 according to the first embodiment.

The multicast transfer unit 14 includes a coupler 141, an amplifier 142, a coupler 143, a transfer wavelength control unit 144, and a plurality of wavelength-tunable filters 145-1 to 145-nP. The coupler 141 is connected to the n optical transmission lines connected to the second ports of each optical SW 10 (nP optical transmission lines in total) and receives an optical signal transmitted via any of the nP optical transmission lines as an input. The coupler 141 multiplexes the input optical signals and outputs the multiplexed optical signal. The number of ports required for the coupler 141 is n×P. The coupler 141 is one aspect of a first multiplexing/demultiplexing unit.

The amplifier 142 amplifies the optical signal output from the coupler 141.

The coupler 143 splits the optical signal amplified by the amplifier 142 and outputs the split optical signals. The number of ports required for the coupler 143 is n×P. The coupler 143 is one aspect of a second multiplexing/demultiplexing unit.

The transfer wavelength control unit 144 sets a wavelength to be transmitted through the wavelength-tunable filters 145-1 to 145-nP in response to an instruction from the control unit 12. Specifically, in a case where the transfer wavelength control unit 144 receives, from the control unit 12, an instruction on a wavelength to be transferred at the time of multicast communication, the transfer wavelength control unit 144 sets a designated wavelength to the wavelength-tunable filters 145-1 to 145-nP. Therefore, optical signals having the set wavelength can be transmitted through the wavelength-tunable filters 145-1 to 145-nP. The transfer wavelength control unit 144 may be mounted on the control unit 12.

The wavelength-tunable filters 145-1 to 145-nP are provided on nP optical transmission lines connecting the coupler 143 and the second ports of each optical SW 11 and transmit an optical signal having the wavelength set by the transfer wavelength control unit 144 (hereinafter, referred to as a "set wavelength").

Figure 3:
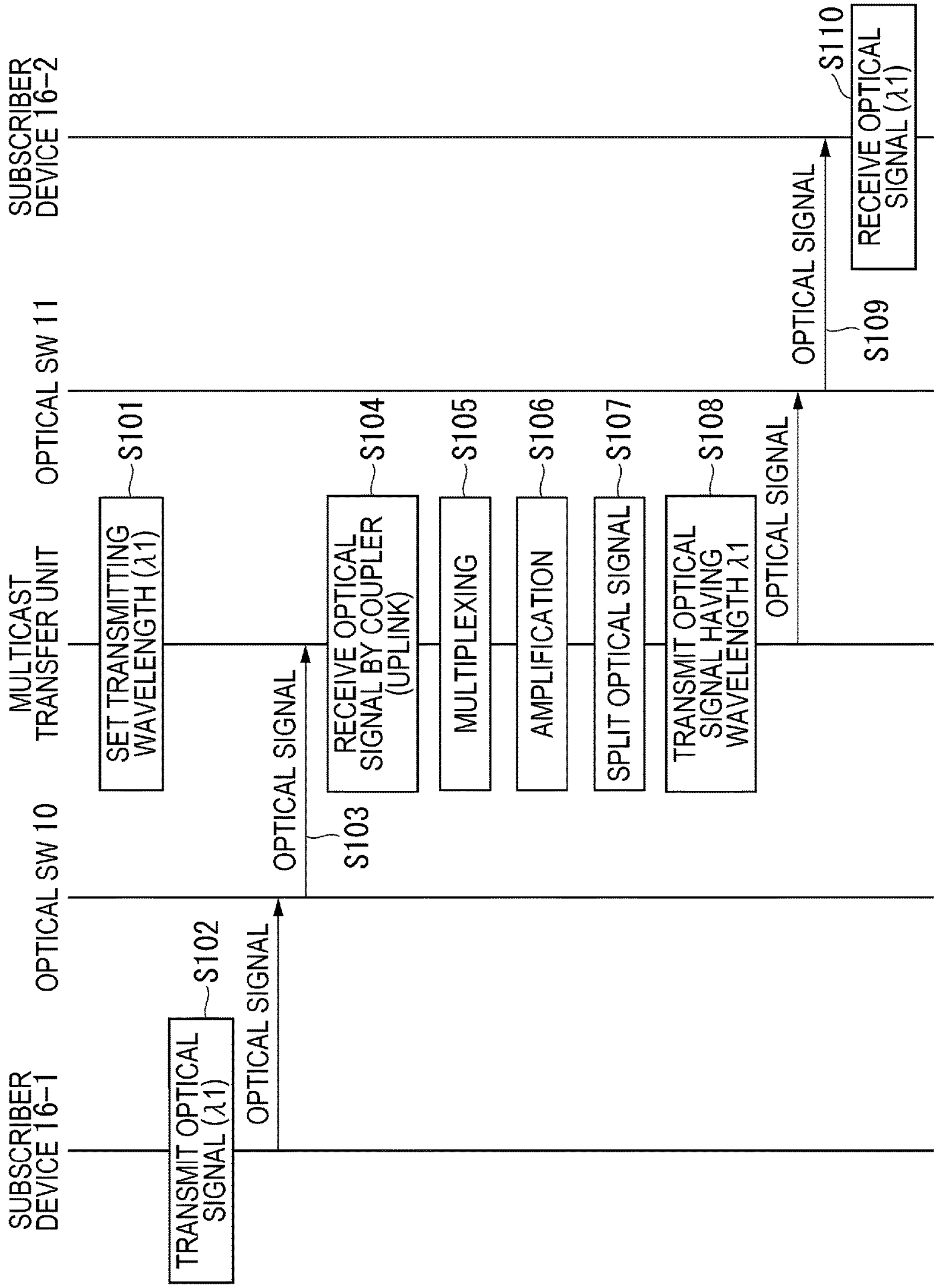
FIG. 3 is a sequence diagram showing a flow of processing of the optical communication system according to the first embodiment.

FIG. 3 is a sequence diagram showing a flow of processing of the optical communication system 1 according to the first embodiment. In FIG. 3, a case where an optical signal transmitted from the subscriber device 16-1 connected to the optical SW 10-1 of FIG. 1 is multicast to the subscriber device 16-2 connected to the optical SW 11-1 and the subscriber device 16-3 connected to the optical SW 11-P will be described. Here, a wavelength λ1 is assumed to be allocated to the subscriber device 16-1, the subscriber device 16-2, and the subscriber device 16-3. FIG. 3 omits illustration of the optical SW 11-P and the subscriber device 16-3.

The transfer wavelength control unit 144 performs setting so as to transmit optical signals having the wavelength λ1 through the wavelength-tunable filters 145-1 to 145-nP (step S101). The subscriber device 16-1 transmits an optical signal having the wavelength λ1 (step S102). The optical signal having the wavelength λ1 transmitted from the subscriber device 16-1 is input to the first port of the optical SW 10-1 via the optical transmission line 18-2.

The optical SW 10-1 is controlled by the optical SW control unit 122 so as to connect a path between the first port of the optical SW 10-1 to which the subscriber device 16-1 is connected and the second port of the optical SW 10-1 to which the multicast transfer unit 14 is connected. Therefore, the optical signal having the wavelength λ1 input to the first port of the optical SW 10-1 is output from the second port to the multicast transfer unit 14 (step S103).

The optical signal having the wavelength λ1 output from the optical SW 10-1 is input to the coupler 141 (step S104). The coupler 141 multiplexes the input optical signals and outputs the multiplexed optical signal (step S105). The optical signal output from the coupler 141 is amplified by the amplifier 142 (step S106). The optical signal amplified by the amplifier 142 is input to the coupler 143.

The coupler 143 splits the input optical signal to the connected optical transmission lines (step S107). The optical signals split to the respective optical transmission lines are input to the wavelength-tunable filters 145-1 to 145-nP. Here, because the wavelength λ1 is set as the set wavelength, the optical signals having the wavelength λ1 are output from the wavelength-tunable filters 145-1 to 145-nP. The optical signals having the wavelength λ1 output from the wavelength-tunable filters 145-1 to 145-nP are input to the second ports of the optical SWs 11-1 and 11-P via the optical transmission lines.

The optical SW 11-1 is controlled by the optical SW control unit 122 so as to connect a path between the first port of the optical SW 11-1 to which the subscriber device 16-2 is connected and the second port of the optical SW 11-1 to which the multicast transfer unit 14 is connected. Therefore, the optical signal having the wavelength λ1 input to the second port of the optical SW 11-1 is output from the first port to the subscriber device 16-2 via the optical transmission line 18-3 (step S109). The subscriber device 16-2 receives the optical signal having the wavelength λ1 output from the optical SW 11-1 (step S110).

The optical SW 11-P is controlled by the optical SW control unit 122 so as to connect a path between the first port of the optical SW 11-P to which the subscriber device 16-3 is connected and the second port of the optical SW 11-P to which the multicast transfer unit 14 is connected. Therefore, the optical signal having the wavelength λ1 input to the second port of the optical SW 11-P is output from the first port to the subscriber device 16-3 via the optical transmission line 18-4. The subscriber device 16-3 receives the optical signal having the wavelength λ1 output from the optical SW 11-P.

According to the optical communication system 1 configured as described above, in a case where multicast communication is performed in the optical communication system 1 including the plurality of optical SWs 10 and 11, the number of wires required for return in each optical SW can be suppressed to n. Therefore, each subscriber device can be connected to an arbitrary subscriber device at an arbitrary timing by using the number of return transmission lines smaller than before.

Modification Example of First Embodiment

The coupler 141 may be changed to a WSS or cyclic arrayed waveguide gratings (AWG). In such a configuration, the WSS is connected to the n optical transmission lines connected to the second ports of each optical SW 10 (nP optical transmission lines in total) and outputs an optical signal having the set wavelength among optical signals transmitted via a certain optical transmission line. The WSS is a wavelength selective optical switch. The number of ports required for the WSS is n×P.

The AWG is connected to the n optical transmission lines connected to the second ports of each optical SW 10 (nP optical transmission lines in total) and inputs an optical signal output from each optical SW 10 via a path corresponding to the wavelength. The AWG outputs the input optical signal to the amplifier 142. The number of ports required for the AWG is n×P.

Second Embodiment

A second embodiment is similar to the first embodiment in the system configuration of the optical communication system 1, except for the configuration of the multicast transfer unit 14. Therefore, hereinafter, differences from the first embodiment will be described.

Figure 4:
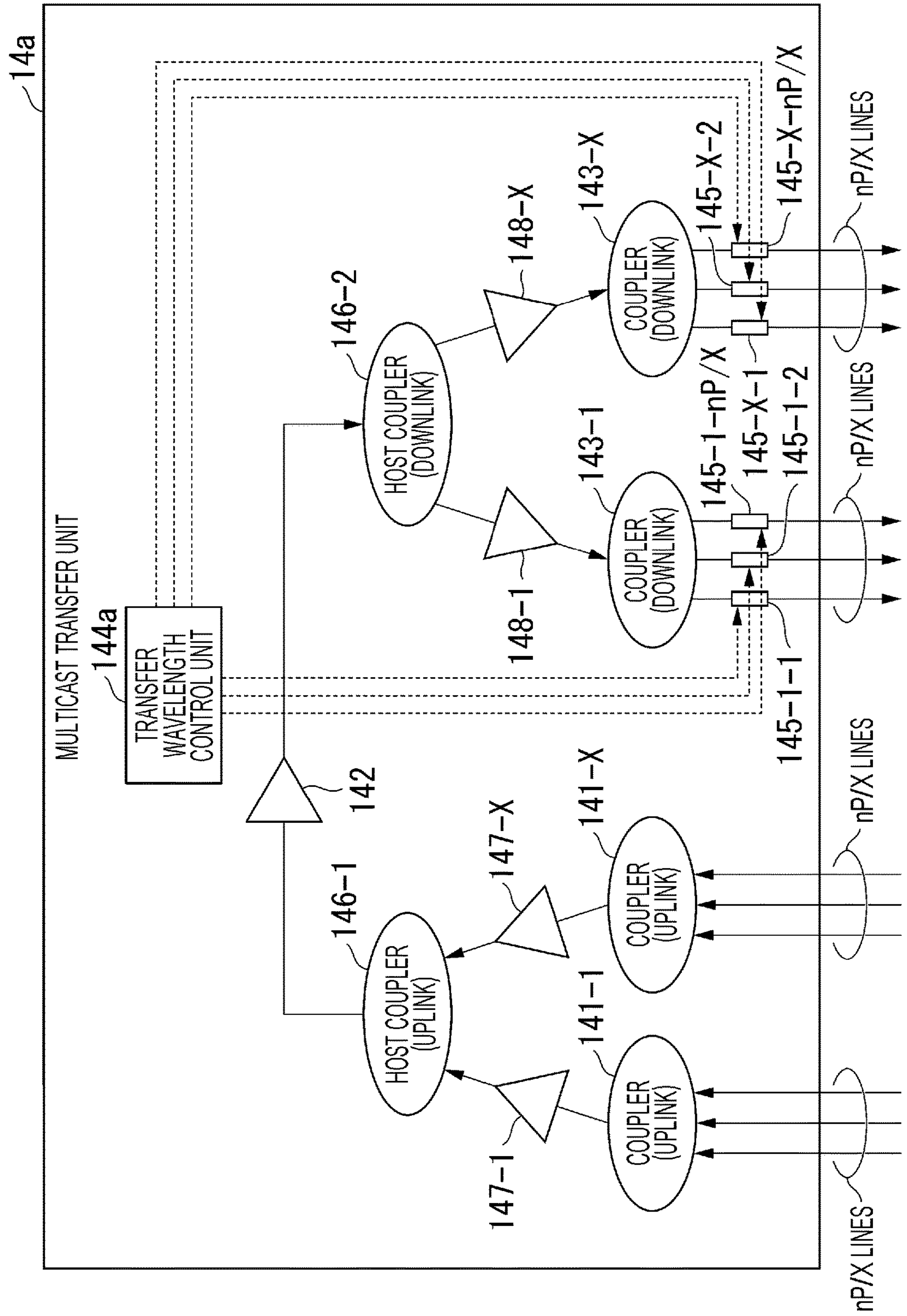
FIG. 4 is a block diagram illustrating a specific example of a (first) functional configuration of a multicast transfer unit according to a second embodiment.

FIG. 4 is a block diagram illustrating a specific example of a (first) functional configuration of a multicast transfer unit 14*a* according to the second embodiment.

The multicast transfer unit 14*a* includes a plurality of couplers 141-1 to 141-X (X is an integer of 2 or more), the amplifier 142, a plurality of couplers 143-1 to 143-X, a transfer wavelength control unit 144*a*, a plurality of wavelength-tunable filters 145-1-1 to 145-1-nP/X, 145-X-1 to 145-X-nP/X, a plurality of host couplers 146-1 and 146-2, a plurality of amplifiers 147-1 to 147-X, and a plurality of amplifiers 148-1 to 148-X.

In the example of FIG. 4, a coupler 141-*x* (1≤x≤X) is connected to the host coupler 146-1 via an amplifier 147-*x*, a coupler 143-*x* is connected to the host coupler 146-2 via an amplifier 148-*x*, and the host coupler 146-1 and the host coupler 146-2 are connected via the amplifier 142.

The coupler 141-*x* is connected to different nP/X optical transmission lines among the n optical transmission lines connected to the second ports of each optical SW 10 (nP optical transmission lines in total) and receives an optical signal transmitted via any of the nP/X optical transmission lines as an input. The coupler 141-*x* multiplexes the input optical signals and outputs the multiplexed optical signal. In this manner, approximately the same number of optical transmission lines is connected to each coupler 141 on average. For example, when the number of couplers 141 is two (X=2), the number of optical SWs 10 is three (P=3), and the number of optical transmission lines connected to the second ports of each optical SW 10 is two (n=2), three different optical transmission lines are connected to each coupler 141.

The amplifier 147-*x* amplifies the optical signal output from the coupler 141-*x*.

The host coupler 146-1 multiplexes the optical signals amplified by the respective amplifiers 147 and outputs the multiplexed optical signal.

The host coupler 146-2 splits the optical signal output from the host coupler 146-1 and amplified by the amplifier 142.

The amplifier 148-*x* amplifies the optical signal output from the host coupler 146-2.

The coupler 143-*x* splits the optical signal amplified by the amplifier 148-*x* and outputs the split optical signals.

The wavelength-tunable filters 145-1-1 to 145-1-nP/X are provided on the nP/X optical transmission lines connecting the coupler 143-1 and the second ports of each optical SW 11 and transmit optical signals having the set wavelength.

The wavelength-tunable filters 145-X-1 to 145-X-nP/X are provided on the nP/X optical transmission lines connecting the coupler 143-X and the second ports of each optical SW 11 and transmit optical signals having the set wavelength.

The transfer wavelength control unit 144*a* sets a wavelength to be transmitted through the wavelength-tunable filters 145-1-1 to 145-1-nP/X and 145-X-1 to 145-X-nP/X in response to an instruction from the control unit 12. The transfer wavelength control unit 144*a* may be mounted on the control unit 12.

According to the optical communication system 1 of the second embodiment configured as described above, the X couplers 141 and X couplers 143 are arranged in parallel, and the host coupler 146 is arranged on the host side of each of the couplers 141 and 143 arranged in parallel. With such a configuration, the required number of ports per coupler can be reduced, as compared with the first embodiment.

Modification Example of Second Embodiment

Figure 5:
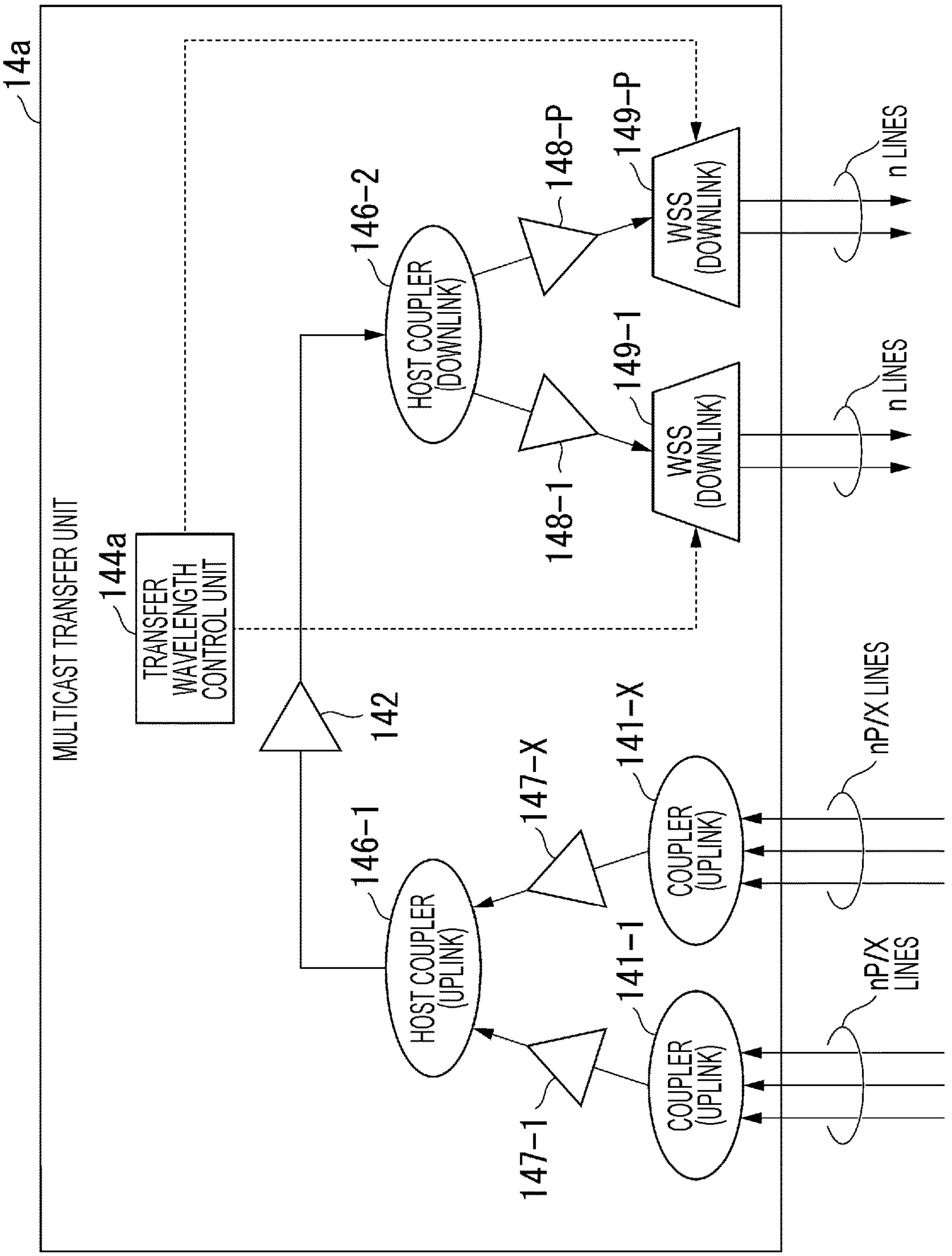
FIG. 5 is a block diagram illustrating a specific example of a (second) functional configuration of the multicast transfer unit according to the second embodiment.

The multicast transfer unit 14*a* may have a configuration of FIG. 5. FIG. 5 is a block diagram illustrating a specific example of a (second) functional configuration of the multicast transfer unit 14*a* according to the second embodiment.

The multicast transfer unit 14*a* includes the plurality of couplers 141-1 to 141-X, the amplifier 142, the plurality of host couplers 146-1 and 146-2, the plurality of amplifiers 147-1 to 147-X, a plurality of amplifiers 148-1 to 148-P, and a plurality of WSSs 149-1 to 149-P.

In the example of FIG. 5, the couplers 141-1 to 141-X are connected to the host coupler 146-1 via the respective amplifiers 147-1 to 147-X, the WSSs 149-1 to 149-P are connected to the host coupler 146-2 via the respective amplifiers 148-1 to 148-P, and the host coupler 146-1 and the host coupler 146-2 are connected via the amplifier 142.

The configuration of FIG. 5 is different from the configuration of FIG. 4 in that targets to be controlled by the transfer wavelength control unit 144*a* are the WSSs 149 and that the plurality of WSSs 149-1 to 149-P is newly provided instead of the plurality of couplers 143-1 to 143-X. The couplers 141, the amplifier 142, the amplifiers 147, the host couplers 146, and the amplifiers 148 perform processing similar to that of the functional units having the same names of FIG. 4, and thus description thereof is omitted.

The transfer wavelength control unit 144*a* sets a wavelength to be output by the WSSs 149 in response to an instruction from the control unit 12. Specifically, in a case where the transfer wavelength control unit 144*a* receives, from the control unit 12, an instruction on a wavelength to be transferred at the time of multicast communication, the transfer wavelength control unit 144*a* sets a designated wavelength to the WSSs 149. Therefore, the WSSs 149 can output an optical signal having the set wavelength.

A WSS 149-*p* (1≤p≤P) is connected to different n optical transmission lines among the n optical transmission lines connected to the second ports of each optical SW 11 (nP optical transmission lines in total) and outputs an optical signal amplified by an amplifier 148-*p* to an optical transmission line serving as an output path of the set wavelength. The WSS 149-*p* is one aspect of the second multiplexing/demultiplexing unit.

With the configuration of FIG. 5, the wavelength-tunable filters can be omitted. However, the WSS 149-*p* can output an arbitrary wavelength from only one of the ports. Therefore, it is necessary to prevent one WSS 149-*p* from being connected to the plurality of optical SWs 11. In a case where multicast is performed in one optical SW 11, it is necessary to receive a wavelength at which multicast is performed and split the wavelength in the optical SW 11.

Third Embodiment

A third embodiment is similar to the first embodiment in the system configuration of the optical communication system 1, except for the configuration of the multicast transfer unit 14. Therefore, hereinafter, differences from the first embodiment will be described.

Figure 6:
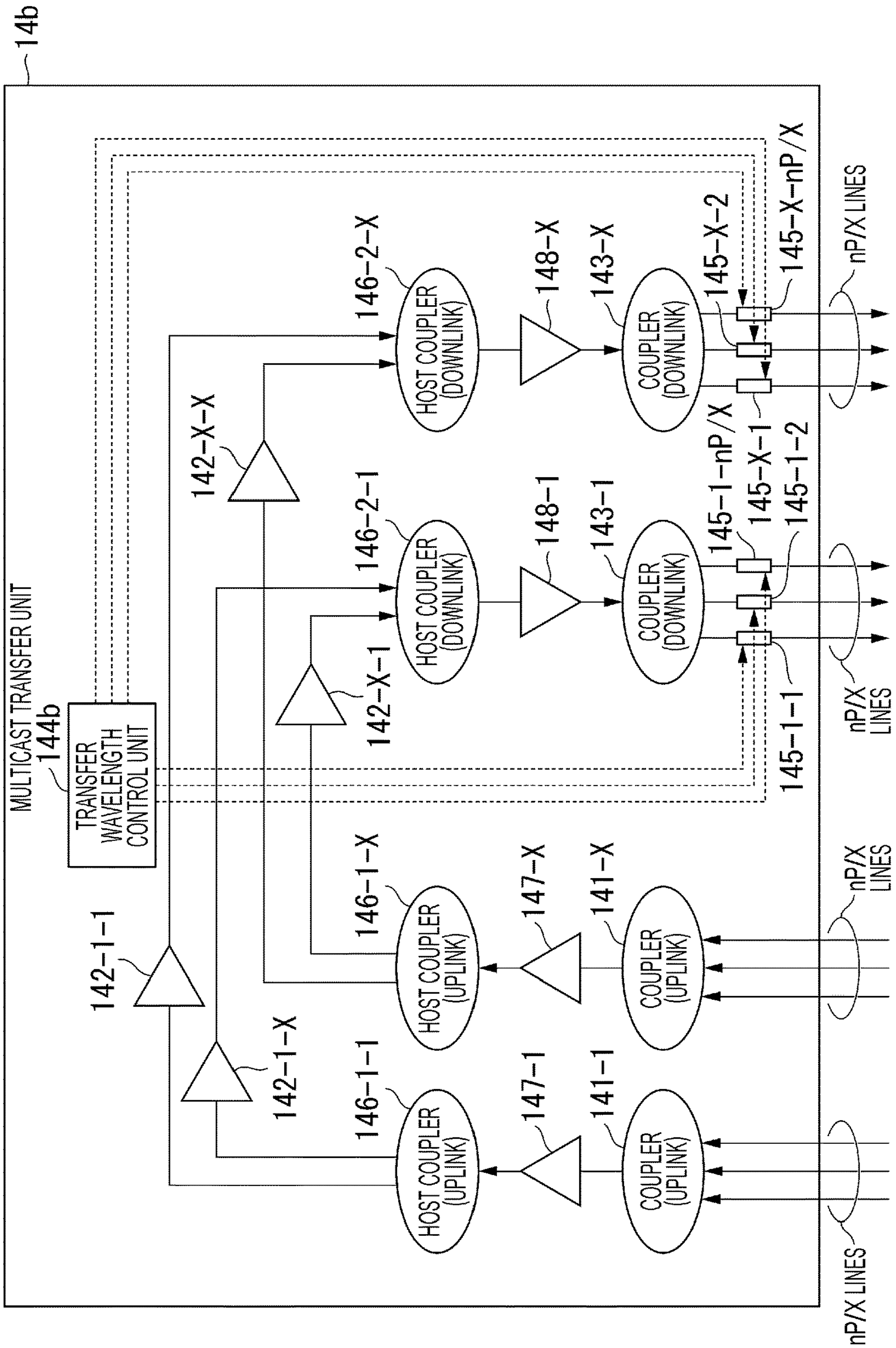
FIG. 6 is a block diagram illustrating a specific example of a (first) functional configuration of a multicast transfer unit according to a third embodiment.

FIG. 6 is a block diagram illustrating a specific example of a (first) functional configuration of a multicast transfer unit 14*b* according to the third embodiment.

The multicast transfer unit 14*b* includes the plurality of couplers 141-1 to 141-X, a plurality of amplifiers 142-1-1 to 142-X-X, the plurality of couplers 143-1 to 143-X, the transfer wavelength control unit 144*b*, the plurality of wavelength-tunable filters 145-1-1 to 145-1-nP/X and 145-X-1 to 145-X-nP/X, a plurality of host couplers 146-1-1 to 146-1-X, a plurality of host couplers 146-2-1 to 146-2-X, the plurality of amplifiers 147-1 to 147-X, and the plurality of amplifiers 148-1 to 148-X.

In the example of FIG. 6, the coupler 141-*x* is connected to a host coupler 146-1-*x* via the amplifier 147-*x*, the coupler 143-*x* is connected to a host coupler 146-2-*x* via the amplifier 148-*x*, and the host couplers 146-1 and the host couplers 146-2 are connected via the amplifiers 142.

The coupler 141-*x* is connected to different nP/X optical transmission lines among the n optical transmission lines connected to the second ports of each optical SW 10 (nP optical transmission lines in total) and receives an optical signal transmitted via any of the nP/X optical transmission lines as an input. The coupler 141-*x* multiplexes the input optical signals and outputs the multiplexed optical signal.

The amplifier 147-*x* amplifies the optical signal output from the coupler 141-*x*.

The host coupler 146-1-*x* splits the optical signal amplified by the amplifier 147-*x* and outputs the split optical signals.

The host coupler 146-2-*x* multiplexes the optical signals output from the respective host couplers 146-1 and amplified by the connected amplifiers 142.

The amplifier 148-*x* amplifies the optical signal output from the host coupler 146-2-*x*.

The coupler 143-*x* splits the optical signal amplified by the amplifier 148-*x* and outputs the split optical signals.

The wavelength-tunable filters 145-1-1 to 145-1-nP/X are provided on the nP/X optical transmission lines connecting the coupler 143-1 and the second ports of each optical SW 11 and transmit optical signals having the set wavelength.

The wavelength-tunable filters 145-X-1 to 145-X-nP/X are provided on the nP/X optical transmission lines connecting the coupler 143-X and the second ports of each optical SW 11 and transmit optical signals having the set wavelength.

The transfer wavelength control unit 144*b* sets a wavelength to be transmitted through the wavelength-tunable filters 145-1-1 to 145-1-nP/X and 145-X-1 to 145-X-nP/X in response to an instruction from the control unit 12. The transfer wavelength control unit 144*b* may be mounted on the control unit 12.

According to the optical communication system 1 of the third embodiment configured as described above, not only the X couplers 141 and the X couplers 143 but also the host couplers 146-1 and the host couplers 146-2 are also arranged in parallel. In the second embodiment, a maximum of nP wavelengths need to be aggregated in the host coupler 146. Meanwhile, in the third embodiment, the maximum number of wavelengths accommodated in each coupler is nP/X. This makes it possible to reduce the number of wavelengths to be accommodated in one coupler.

Modification Example of Third Embodiment

Figure 7:
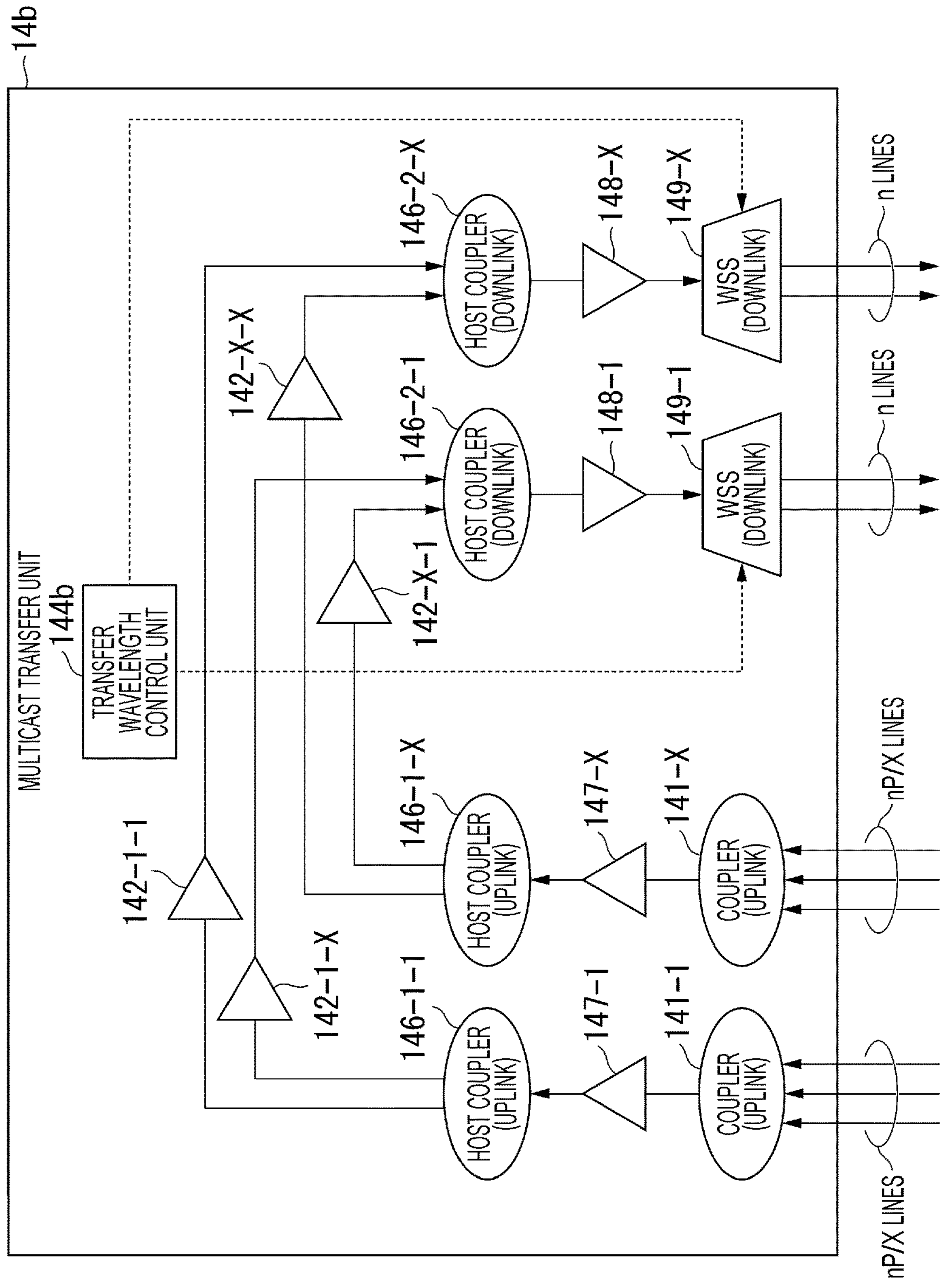
FIG. 7 is a block diagram illustrating a specific example of a (second) functional configuration of the multicast transfer unit according to the third embodiment.

The multicast transfer unit 14*b* may have a configuration of FIG. 7. FIG. 7 is a block diagram illustrating a specific example of a (second) functional configuration of the multicast transfer unit 14*b* according to the third embodiment.

The multicast transfer unit 14*b* includes the plurality of couplers 141-1 to 141-X, the plurality of amplifiers 142-1-1 to 142-X-X, the transfer wavelength control unit 144*b*, the plurality of host couplers 146-1-1 to 146-1-X, the plurality of host couplers 146-2-1 to 146-2-X, the plurality of amplifiers 147-1 to 147-X, the plurality of amplifiers 148-1 to 148-X, and a plurality of WSSs 149-1 to 149-X.

In the example of FIG. 7, the coupler 141-*x* is connected to the host coupler 146-1-*x* via the amplifier 147-*x*, the WSS 149-*x* is connected to the host coupler 146-2-*x* via the amplifier 148-*x*, and the host couplers 146-1 and the host couplers 146-2 are connected via the amplifiers 142. The configuration of FIG. 7 is different from the configuration of FIG. 6 in that targets to be controlled by the transfer wavelength control unit 144*b* are the WSSs 149 and that the plurality of WSSs 149-1 to 149-X is newly provided instead of the plurality of couplers 143-1 to 143-X. The couplers 141, the amplifiers 142, the amplifiers 147, the host couplers 146, and the amplifiers 148 perform processing similar to that of the functional units having the same names of FIG. 6, and thus description thereof is omitted.

A WSS 149-*x* is connected to different n optical transmission lines among the n optical transmission lines connected to the second ports of each optical SW 11 (nP optical transmission lines in total) and outputs an optical signal amplified by the amplifier 148-*x* to an optical transmission line serving as an output path of the set wavelength.

The transfer wavelength control unit 144*b* sets a wavelength to be output by the WSSs 149 in response to an instruction from the control unit 12. Specifically, in a case where the transfer wavelength control unit 144*b* receives, from the control unit 12, an instruction on a wavelength to be transferred at the time of multicast communication, the transfer wavelength control unit 144*b* sets a designated wavelength to the WSSs 149. Therefore, the WSSs 149 can output an optical signal having the set wavelength.

Fourth Embodiment

In the above first to third embodiments, the configuration in which the optical SWs are used as the uplink optical distribution unit and the downlink optical distribution unit connected to the multicast transfer unit has been described. In a fourth embodiment, the uplink optical distribution unit and the downlink optical distribution unit different from those of the first to third embodiments will be described. The fourth embodiment is similar to the first embodiment in the system configuration of the optical communication system 1, except for the configuration of the optical distribution unit. Therefore, hereinafter, differences from the first embodiment will be described.

Figure 8:
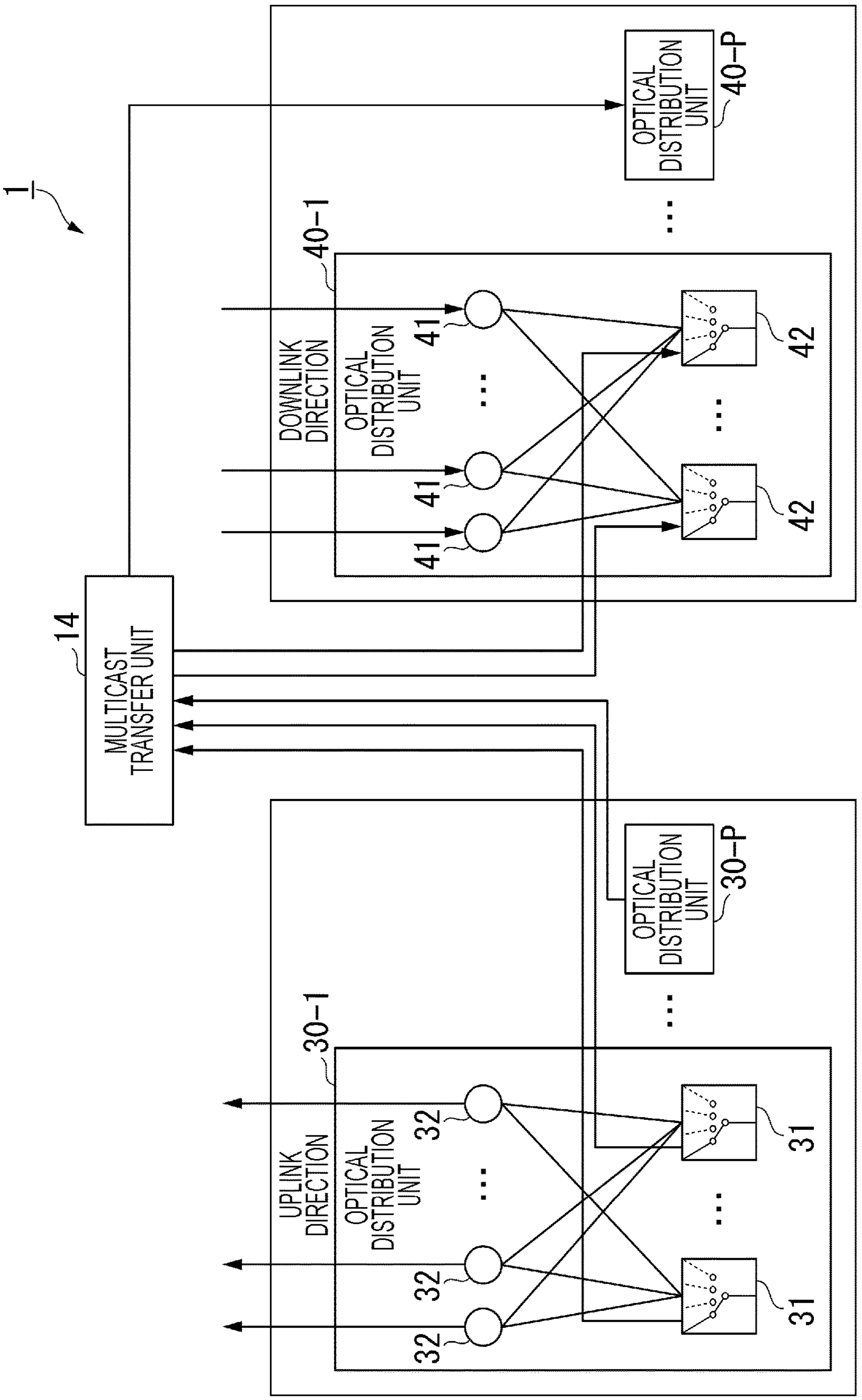
FIG. 8 is a configuration diagram of an optical communication system according to a fourth embodiment.

FIG. 8 is a configuration diagram of the optical communication system 1 according to the fourth embodiment. The optical communication system 1 according to the fourth embodiment includes P optical distribution units 30-1 to 30-P (a plurality of first distributors), P optical distribution units 40-1 to 40-P (a plurality of second distributors), the control unit 12 (not illustrated), and the multicast transfer unit 14 (a multicast transferer). Hereinafter, description will be made on the assumption that the optical distribution units 30-1 to 30-P are used for transmitting optical signals in the uplink direction and that the optical distribution units 40-1 to 40-P are used for transmitting optical signals in the downlink direction.

The optical distribution units 30-1 to 30-P have the same configuration. The optical distribution units 40-1 to 40-P have the same configuration. In the following description, the optical distribution units 30-1 to 30-P will be simply referred to as the optical distribution units 30 when not distinguished, and the optical distribution units 40-1 to 40-P will be simply referred to as the optical distribution units 40 when not distinguished. The optical distribution units 30, the optical distribution units 40, the control unit 12, and the multicast transfer unit 14 are functional units forming one optical communication device. The optical distribution units 30 and the optical distribution units 40 are multicast switches (MCSs).

The optical distribution unit 30 includes a plurality of 1×M optical switches 31 and a plurality of signal multiplexing units (a plurality of signal multiplexers) 32. The number of 1×M optical switches 31 and the number of signal multiplexing units 32 may be the same or different. The optical distribution unit 30 is one aspect of the first optical distribution unit. Each 1×M optical switch 31 is connected to a plurality of optical transmission lines and outputs an optical signal input from any of the optical transmission lines to another optical transmission line. Each 1×M optical switch 31 has one first port and M second ports (M is an integer of 2 or more). The one first port included in each 1×M optical switch 31 is connected to the edge node 15 or the subscriber device 16 via an optical transmission line.

One of the M second ports included in each 1×M optical switch 31 is connected to the multicast transfer unit 14 via an optical transmission line. The remaining second ports (e.g. (M-1) second ports) of the M second ports included in each 1×M optical switch 31 are connected to different signal multiplexing units 32 via optical transmission lines, respectively. Some of the remaining second ports of the M second ports included in each 1×M optical switch 31 may not be connected to the signal multiplexing unit 32.

The signal multiplexing unit 32 is any of an optical coupler, a wavelength selective switch, and an AWG. The signal multiplexing unit 32 multiplexes the optical signals output from each 1×M optical switch 31 and outputs the multiplexed optical signal to another device via an optical transmission line.

The optical distribution unit 40 includes a plurality of signal separation units (a plurality of signal separators) 41 and a plurality of 1×M optical switches 42. The number of signal separation units 41 and the number of 1×M optical switches 42 may be the same or different. The optical distribution unit 40 is one aspect of the second optical distribution unit. The signal separation unit 41 is any of an optical coupler, a wavelength selective switch, and an AWG. The signal separation unit 41 receives, as an input, an optical signal transmitted from another device connected via an optical transmission line. The signal separation unit 41 splits or demultiplexes the input optical signal and outputs the split or demultiplexed optical signals to the respective 1×M optical switches 42. For example, in a case where the optical distribution unit 40 is an optical coupler, the optical coupler splits the input optical signal and outputs the split optical signals to the connected 1×M optical switches 42, respectively. For example, in a case where the optical distribution unit 40 is a wavelength selective switch or AWG, the wavelength selective switch or AWG demultiplexes the input optical signal and outputs the demultiplexed optical signals to the 1×M optical switches 42 connected to ports of the corresponding wavelength.

Each 1×M optical switch 42 is connected to a plurality of optical transmission lines and outputs an optical signal input from any of the optical transmission lines to another optical transmission line. Each 1×M optical switch 42 has one first port and M second ports. The one first port included in each 1×M optical switch 42 is connected to the subscriber device 16 via an optical transmission line.

One of the M second ports included in each 1×M optical switch 42 is connected to the multicast transfer unit 14 via an optical transmission line. The remaining second ports (e.g. (M-1) second ports) of the M second ports included in each 1×M optical switch 42 are connected to different signal separation units 41 via optical transmission lines, respectively. Some of the remaining second ports of the M second ports included in each 1×M optical switch 42 may not be connected to the signal separation unit 41.

An amplifier may be installed to compensate for a signal loss. A place where the amplifier may be installed is any or all of the optical transmission line connected to the first port of each of the 1×M optical switches 31 and 42, the optical transmission line between each 1×M optical switch 31 and each signal multiplexing unit 32, the optical transmission line between each signal separation unit 41 and each 1×M optical switch 42, the optical transmission line on the output side of each signal multiplexing unit 32 (the side opposite to the side to which the 1×M optical switch 31 is connected), and the optical transmission line on the input side of each signal separation unit 41 (the side opposite to the side to which the 1×M optical switch 42 is connected).

The multicast transfer unit 14 receives an optical signal output from the 1×M optical switch 31 as an input and performs multicast transfer of the input optical signal to at least the 1×M optical switch 42 to which a destination subscriber device 16 is connected. One optical transmission line is connected to the multicast transfer unit 14 from one 1×M optical switch 31. Therefore, in a case where n 1×M optical switches 31 are provided in one optical distribution unit 30, n optical transmission lines are connected from one optical distribution unit 30 to the multicast transfer unit 14, and the number of optical distribution units 30 is P, and thus nP uplink optical transmission lines are connected to the multicast transfer unit 14. Further, in a case where n 1×M optical switches 42 are provided in one optical distribution unit 40, n optical transmission lines are connected from one optical distribution unit 40 to the multicast transfer unit 14, and the number of optical distribution units 40 is P, and thus nP downlink optical transmission lines are connected to the multicast transfer unit 14.

In a case where multicast communication is performed across the optical distribution unit 30, the optical SW control unit 122 switches a path between the ports of the 1×M optical switch 31 so as to connect an output destination of an optical signal from the 1×M optical switch 31 to the multicast transfer unit 14. The multicast transfer unit 14 performs control such that the input optical signal is output to a desired 1×M optical switch 42. With this configuration, return communication between arbitrary 1×M optical switches is implemented while the number of wires required for return in each 1×M optical switch is suppressed to nP.

The configuration of the multicast transfer unit 14 may be any of the configurations described in the first to third embodiments. That is, the configuration of the multicast transfer unit 14 may be any of the configurations of FIGS. 2 and 4 to 7.

In the fourth embodiment, the optical SW control unit 122 switches connection between the ports of the 1×M optical switch 31 and connection between the ports of the 1×M optical switch 42. Specifically, in the fourth embodiment, the optical SW control unit 122 switches the connection between the ports for each 1×M optical switch 31 included in each optical distribution unit 30 and the connection between the ports for each 1×M optical switch 42 included in each optical distribution unit 40.

For example, the optical SW control unit 122 switches the connection between the ports so as to connect the first port of the 1×M optical switch 31 to which the edge node 15 or the subscriber device 16 is connected and the second port to which the multicast transfer unit 14 is connected. The 1×M optical switch 31 outputs an optical signal transmitted from the edge node 15 or subscriber device 16 connected to the first port from the second port to which the multicast transfer unit 14 is connected. Therefore, the optical signal input to the first port of the 1×M optical switch 31 is directly input to the multicast transfer unit 14.

Similarly, the optical SW control unit 122 switches the connection between the ports so as to connect the first port of the 1×M optical switch 42 to which a desired subscriber device 16 is connected and the second port to which the multicast transfer unit 14 is connected. The optical signal transferred from the multicast transfer unit 14 is input to the second port of the 1×M optical switch 42. The 1×M optical switch 42 receives, as an input, the optical signal transferred from the multicast transfer unit 14 connected to the second port and outputs the input optical signal from the first port. Therefore, the optical signal output from the multicast transfer unit 14 is transferred to the desired subscriber device 16.

Figure 9:
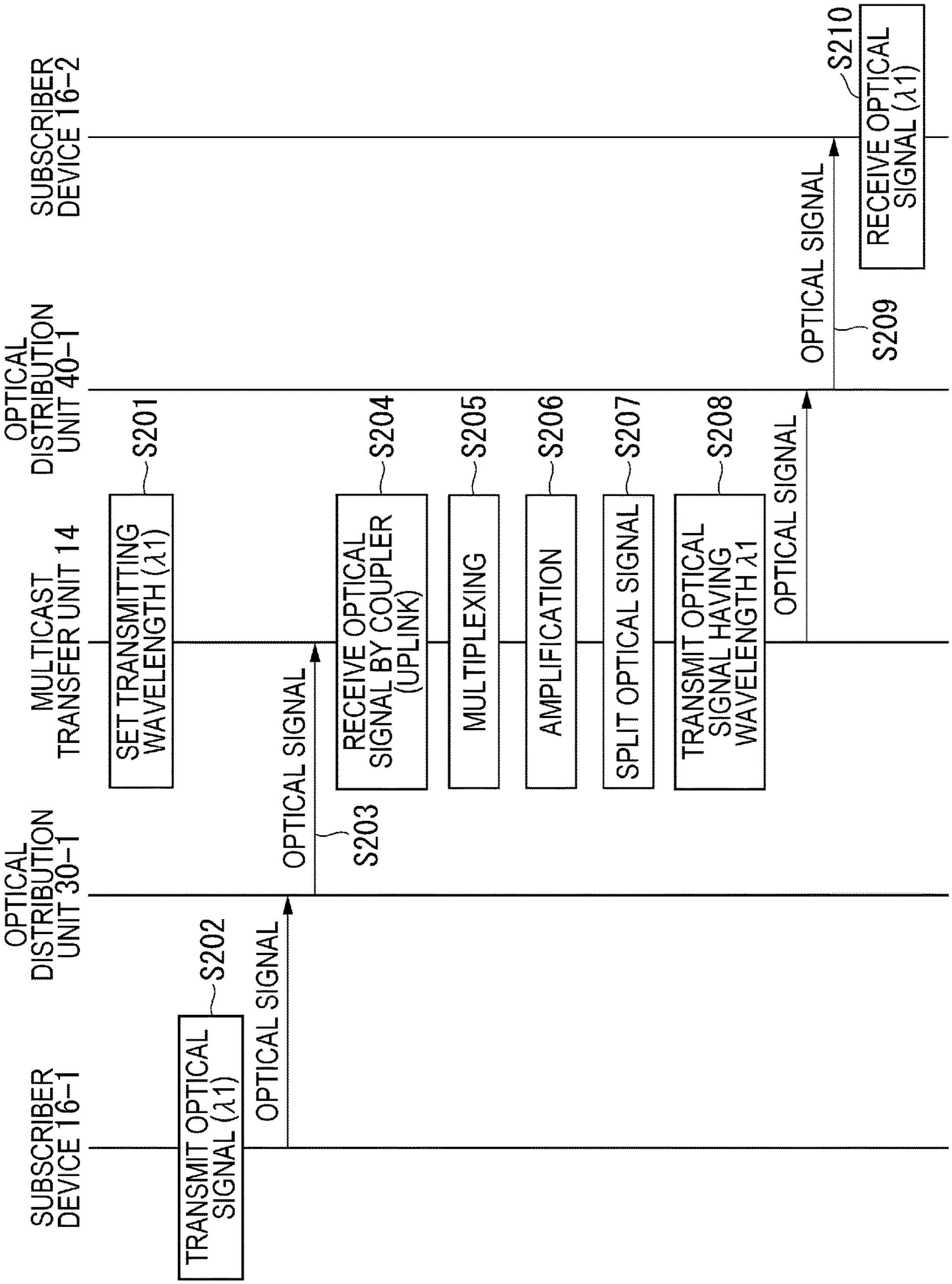
FIG. 9 is a sequence diagram showing a flow of processing of the optical communication system according to the fourth embodiment.

FIG. 9 is a sequence diagram showing a flow of processing of the optical communication system 1 according to the fourth embodiment. In FIG. 9, a case where an optical signal transmitted from the subscriber device 16-1 connected to the optical distribution unit 30-1 is multicast to the subscriber device 16-2 connected to the optical distribution unit 40-1 and the subscriber device 16-3 connected to the optical distribution unit 40-P will be described. Here, a wavelength λ1 is assumed to be allocated to the subscriber device 16-1, the subscriber device 16-2, and the subscriber device 16-3. FIG. 9 omits illustration of the optical distribution unit 40-P and the subscriber device 16-3. The configuration of the multicast transfer unit 14 will be described by using the configuration of FIG. 2 as an example.

The transfer wavelength control unit 144 of the multicast transfer unit 14 performs setting so as to transmit optical signals having the wavelength λ1 through the wavelength-tunable filters 145-1 to 145-nP (step S201). The subscriber device 16-1 transmits an optical signal having the wavelength λ1 (step S202). The optical signal having the wavelength λ1 transmitted from the subscriber device 16-1 is input to one 1×M optical switch 31 included in the optical distribution unit 30-1 via an optical transmission line.

The 1×M optical switch 31 is controlled by the optical SW control unit 122 so as to connect a path between the first port of the 1×M optical switch 31 to which the subscriber device 16-1 is connected and the second port of the 1×M optical switch 31 to which the multicast transfer unit 14 is connected. Therefore, the optical signal having the wavelength λ1 input to the first port of the 1×M optical switch 31 is output from the second port to which the multicast transfer unit 14 is connected. The optical signal output from the 1×M optical switch 31 is input to the multicast transfer unit 14 (step S203).

The optical signal having the wavelength λ1 output from the 1×M optical switch 31 is input to the coupler 141 included in the multicast transfer unit 14 (step S204). The coupler 141 multiplexes the input optical signals and outputs the multiplexed optical signal (step S205). The optical signal output from the coupler 141 is amplified by the amplifier 142 (step S206). The optical signal amplified by the amplifier 142 is input to the coupler 143.

The coupler 143 splits the input optical signal to the connected optical transmission lines (step S207). The optical signals split to the respective optical transmission lines are input to the wavelength-tunable filters 145-1 to 145-nP. Here, because the wavelength λ1 is set as the set wavelength, the optical signals having the wavelength 21 are output from the wavelength-tunable filters 145-1 to 145-nP. The optical signals having the wavelength λ1 output from the wavelength-tunable filters 145-1 to 145-nP are input to the second ports of the plurality of 1×M optical switches 42 included in the optical distribution unit 40-1 and the second ports of the plurality of 1×M optical switches 42 included in the optical distribution unit 40-P via the optical transmission lines.

The optical SW control unit 122 performs control so as to connect a path between the first port of the 1×M optical switch 42 to which the subscriber device 16-2 is connected among the plurality of 1×M optical switches 42 included in the optical distribution unit 40-1 and the second port of the 1×M optical switch 42 to which the multicast transfer unit 14 is connected. Therefore, the optical signal having the wavelength λ1 input to the second port of the 1×M optical switch 42 is output from the first port to the subscriber device 16-2 via the optical transmission line (step S209). The subscriber device 16-2 receives the optical signal having the wavelength λ1 output from the 1×M optical switch 42 (step S210).

The optical SW control unit 122 performs control so as to connect a path between the first port of the 1×M optical switch 42 to which the subscriber device 16-3 is connected among the plurality of 1×M optical switches 42 included in the optical distribution unit 40-P and the second port of the 1×M optical switch 42 to which the multicast transfer unit 14 is connected. Therefore, the optical signal having the wavelength λ1 input to the second port of the 1×M optical switch 42 is output from the first port to the subscriber device 16-3 via the optical transmission line. The subscriber device 16-3 receives the optical signal having the wavelength λ1 output from the 1×M optical switch 42.

According to the optical communication system 1 of the fourth embodiment configured as described above, the number of wires required for return in each of the optical distribution units 30 and 40 can be suppressed even in the configuration including multicast switches instead of the optical SWs as the optical distribution units. Therefore, each subscriber device can be connected to an arbitrary subscriber device at an arbitrary timing by using the number of return transmission lines smaller than before.

First Modification Example of Fourth Embodiment

Figure 10:
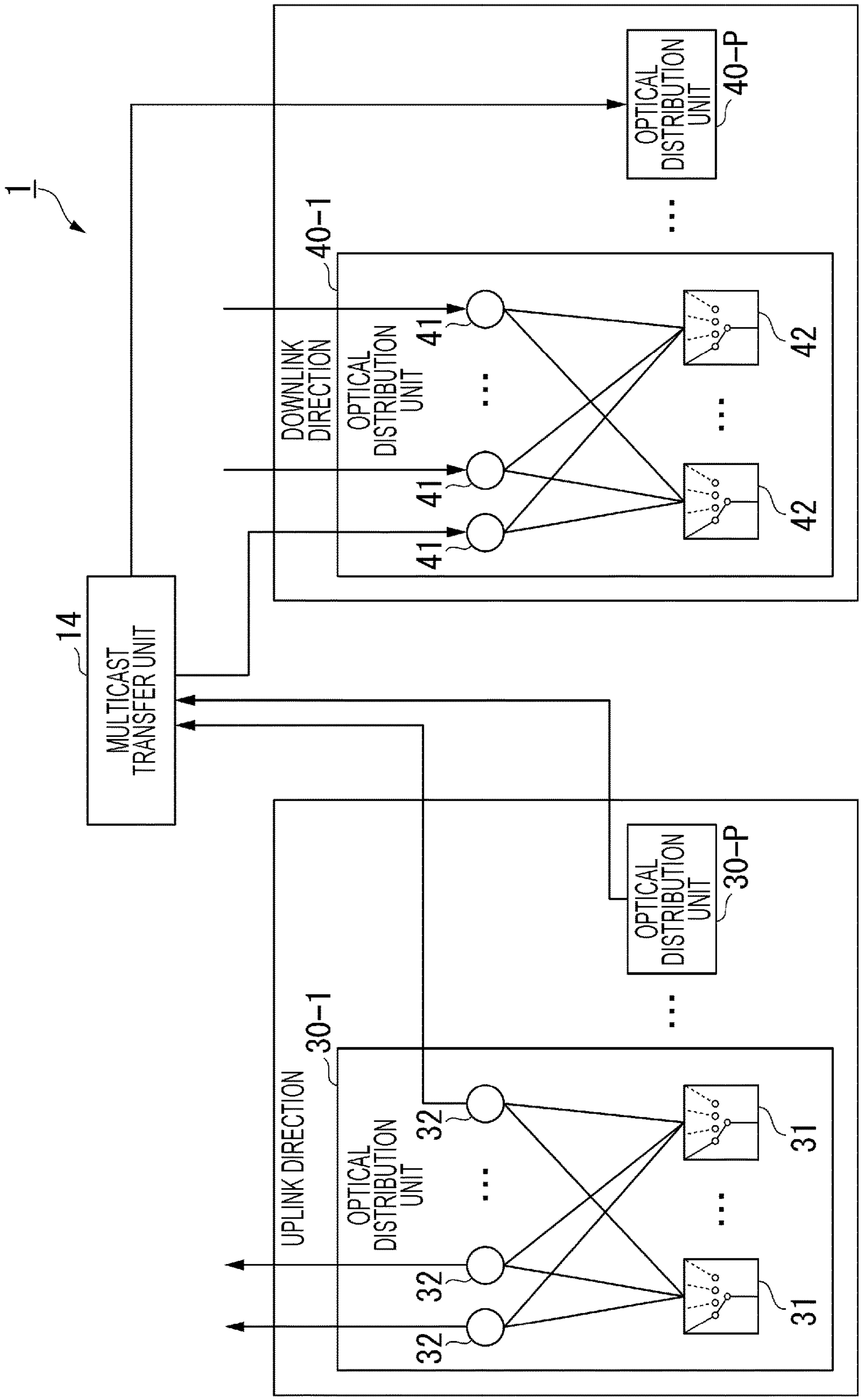
FIG. 10 is a configuration diagram of an optical communication system according to a modification example of the fourth embodiment.

The optical distribution units 30 and the optical distribution units 40 may have a configuration of FIG. 10. FIG. 10 is a configuration diagram of the optical communication system 1 according to a modification example of the fourth embodiment. The optical communication system 1 according to the modification example of the fourth embodiment has a system configuration similar to that of the fourth embodiment. FIG. 10 is different from FIG. 8 in connection between the optical distribution unit 30 and the multicast transfer unit 14 and connection between the optical distribution unit 40 and the multicast transfer unit 14.

In the configuration of FIG. 8, one of the second ports of each 1×M optical switch 31 is connected to the multicast transfer unit 14, and one of the second ports of each 1×M optical switch 42 is connected to the multicast transfer unit 14. Meanwhile, in the configuration of FIG. 10, one of the plurality of signal multiplexing units 32 is connected to the multicast transfer unit 14, and one of the plurality of signal separation units 41 is connected to the multicast transfer unit 14. With such a configuration, one optical distribution unit 30 or 40 only needs to be connected to the multicast transfer unit 14 via one optical transmission line. Therefore, it is unnecessary to connect one optical distribution unit 30 or 40 to the multicast transfer unit 14 via optical transmission lines corresponding to the number of 1×M optical switches 31, unlike the fourth embodiment. This makes it possible to reduce the number of optical transmission lines connected to the multicast transfer unit 14.

In a case where multicast communication is performed across the optical distribution unit 30 in the configuration of FIG. 10, the optical SW control unit 122 switches a path between the ports of each 1×M optical switch 31 such that an optical signal input to each 1×M optical switch 31 is input to the multicast transfer unit 14. Specifically, the optical SW control unit 122 switches the path between the ports of the 1×M optical switch 31 so as to connect the second port of the 1×M optical switch 31 connected to the signal multiplexing unit 32 connected to the multicast transfer unit 14 and the first port of the 1×M optical switch 31. The 1×M optical switch 31 outputs an optical signal transmitted from the edge node 15 or subscriber device 16 connected to the first port from the second port connected to the signal multiplexing unit 32 connected to the multicast transfer unit 14. The signal multiplexing unit 32 multiplexes the optical signals output from each 1×M optical switch 31 and outputs the multiplexed optical signal to the multicast transfer unit 14. Therefore, the optical signals input to the first ports of the 1×M optical switches 31 are input to the multicast transfer unit 14 via the signal multiplexing units 32.

Similarly, the optical SW control unit 122 switches the path between the ports of the 1×M optical switch 42 so as to connect the second port of the 1×M optical switch 42 connected to the signal separation unit 41 connected to the multicast transfer unit 14 and the first port of the 1×M optical switch 42. The signal separation unit 41 splits or demultiplexes the optical signal transferred from the multicast transfer unit 14 and outputs the split or demultiplexed optical signals to the respective 1×M optical switches 42. The 1×M optical switch 42 receives, as an input, the optical signal output from the signal separation unit 41 connected to the second port and outputs the input optical signal from the first port. Therefore, the optical signal multicast from the multicast transfer unit 14 is input to the second port of the 1×M optical switch 42 via the signal separation unit 41. The optical signal input to the second port of the 1×M optical switch 42 is output from the first port and is input to the desired subscriber device 16.

Second Modification Example of Fourth Embodiment

In the above embodiment, the configuration in which one optical communication device includes the optical distribution units 30, the optical distribution units 40, and the multicast transfer unit 14 has been described. Any of the optical distribution units 30, the optical distribution units 40, and the multicast transfer unit 14 may be mounted on another device. The same applies to a case where the multicast transfer unit 14 is the multicast transfer unit 14*a* or 14*b*.

Fifth Embodiment

In a fifth embodiment, the uplink optical distribution unit and the downlink optical distribution unit different from those of the first to fourth embodiments will be described. The fifth embodiment is similar to the first embodiment in the system configuration of the optical communication system 1, except for the configuration of the optical distribution unit. Therefore, hereinafter, differences from the first embodiment will be described.

Figure 11:
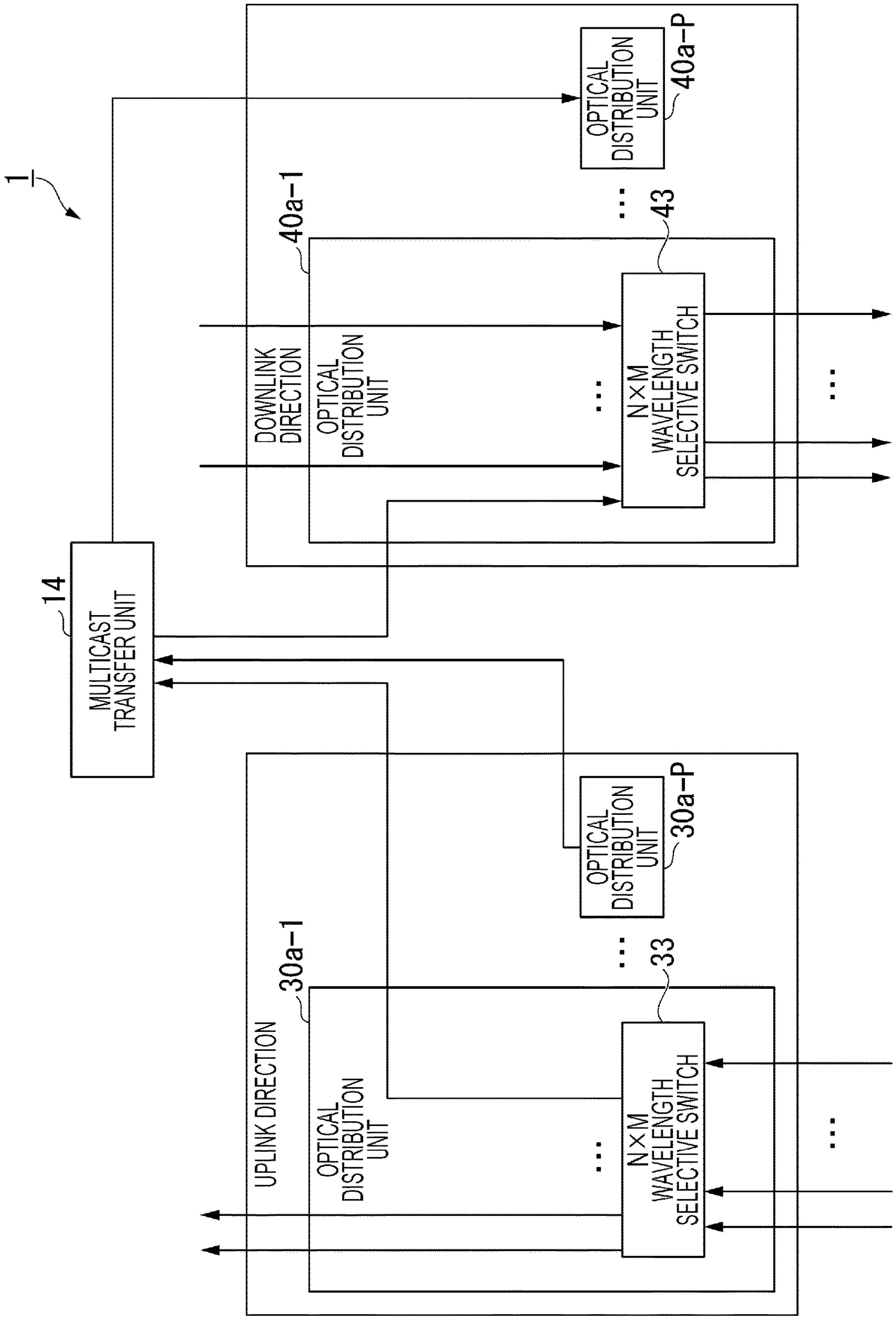
FIG. 11 is a configuration diagram of an optical communication system according to a fifth embodiment.

FIG. 11 is a configuration diagram of the optical communication system 1 according to the fifth embodiment. The optical communication system 1 according to the fifth embodiment includes P optical distribution units 30*a*-1 to 30*a*-P, P optical distribution units 40*a*-1 to 40*a*-P, the control unit 12 (not illustrated), and the multicast transfer unit 14. Hereinafter, description will be made on the assumption that the optical distribution units 30*a*-1 to 30*a*-P are used for transmitting optical signals in the uplink direction and that the optical distribution units 40*a*-1 to 40*a*-P are used for transmitting optical signals in the downlink direction.

The optical distribution units 30*a*-1 to 30*a*-P have the same configuration. The optical distribution units 40*a*-1 to 40*a*-P have the same configuration. In the following description, the optical distribution units 30*a*-1 to 30*a*-P will be simply referred to as the optical distribution units 30*a* when not distinguished, and the optical distribution units 40*a*-1 to 40*a*-P will be simply referred to as the optical distribution units 40*a* when not distinguished. The optical distribution units 30*a*, the optical distribution units 40*a*, the control unit 12, and the multicast transfer unit 14 are functional units forming one optical communication device.

The optical distribution unit 30*a* includes one or more N×M wavelength selective switches 33. The optical distribution unit 30*a* is one aspect of the first optical distribution unit. The N× M wavelength selective switch 33 is connected to a plurality of optical transmission lines and outputs an optical signal input from any of the optical transmission lines to another optical transmission line. The N×M wavelength selective switch 33 includes N (N is an integer of 1 or more) first ports and M second ports. The N first ports included in the N×M wavelength selective switch 33 are connected to the edge node 15 or the subscriber device 16 via optical transmission lines. The N×M wavelength selective switch 33 is a WSS.

One of the M second ports included in the N×M wavelength selective switch 33 is connected to the multicast transfer unit 14 via an optical transmission line. The remaining second ports (e.g. (M-1) second ports) of the M second ports included in the N×M wavelength selective switch 33 are connected to another device via optical transmission lines, respectively.

The optical distribution unit 40*a* includes one or more N×M wavelength selective switches 43. The optical distribution unit 40*a* is one aspect of the second optical distribution unit. The N×M wavelength selective switch 43 is connected to a plurality of optical transmission lines and outputs an optical signal input from any of the optical transmission lines to another optical transmission line. The N×M wavelength selective switch 43 has N first ports and M second ports. The N first ports included in the N×M wavelength selective switch 43 are connected to the subscriber device 16 via optical transmission lines.

One of the M second ports included in the N×M wavelength selective switch 43 is connected to the multicast transfer unit 14 via an optical transmission line. The remaining second ports (e.g. (M−1) second ports) of the M second ports included in the N×M wavelength selective switch 43 are connected to another device via optical transmission lines, respectively. The N×M wavelength selective switch 43 is a WSS.

An amplifier may be installed to compensate for a signal loss. A place where the amplifier may be installed is any or all of the optical transmission line connected to the first port of each of the N×M wavelength selective switches 33 and 43 and the optical transmission line connected to the second port of each of the N×M wavelength selective switches 33 and 43.

The multicast transfer unit 14 receives an optical signal output from each N×M wavelength selective switch 33 as an input and performs multicast transfer of the input optical signal to at least each N×M wavelength selective switch 43 to which a destination subscriber device 16 is connected. One optical transmission line is connected to the multicast transfer unit 14 from one N×M wavelength selective switch 33. Therefore, one optical transmission line is connected from one optical distribution unit 30*a* to the multicast transfer unit 14, and the number of optical distribution units 30*a* is P, and thus P uplink optical transmission lines are connected to the multicast transfer unit 14. Further, one optical transmission line is connected from one optical distribution unit 40*a* to the multicast transfer unit 14, and the number of optical distribution units 40*a* is P, and thus P downlink optical transmission lines are connected to the multicast transfer unit 14.

In a case where multicast communication is performed across the optical distribution unit 30*a*, the optical SW control unit 122 switches a path between the ports of each N×M wavelength selective switch 33 so as to connect an output destination of an optical signal from each N×M wavelength selective switch 33 to the multicast transfer unit 14. The multicast transfer unit 14 performs control such that the input optical signal is output to a desired N×M wavelength selective switch 43. With this configuration, return communication between arbitrary N×M optical switches is implemented while the number of wires required for return in each N×M wavelength selective switch is suppressed to nP.

The configuration of the multicast transfer unit 14 may be any of the configurations described in the first to third embodiments. That is, the configuration of the multicast transfer unit 14 may be any of the configurations of FIGS. 2 and 4 to 7.

In the fifth embodiment, the optical SW control unit 122 switches connection between the ports of the N×M wavelength selective switch 33 and connection between the ports of the N×M wavelength selective switch 43. Specifically, in the fifth embodiment, the optical SW control unit 122 switches the connection between the ports for each N×M wavelength selective switch 33 included in each optical distribution unit 30*a* and the connection between the ports for each N×M wavelength selective switch 43 included in each optical distribution unit 40*a*.

For example, the optical SW control unit 122 switches the connection between the ports so as to connect the first port of the N×M wavelength selective switch 33 to which the edge node 15 or the subscriber device 16 serving as a transmission target is connected and the second port to which the multicast transfer unit 14 is connected. The N×M wavelength selective switch 33 outputs an optical signal transmitted from the edge node 15 or subscriber device 16 connected to the first port from the second port to which the multicast transfer unit 14 is connected. Therefore, the optical signal input to the first port of the N×M wavelength selective switch 33 is directly input to the multicast transfer unit 14.

Similarly, the connection between the ports is switched to connect the first port of the N x M wavelength selective switch 43 to which a destination subscriber device 16 is connected and the second port to which the multicast transfer unit 14 is connected. The optical signal transferred from the multicast transfer unit 14 is input to the second port of the N×M wavelength selective switch 43. The N×M wavelength selective switch 43 outputs the optical signal transferred from the multicast transfer unit 14 and input to the second port from the first port to which the destination subscriber device 16 is connected. Therefore, the optical signal output from the multicast transfer unit 14 is transferred to the desired subscriber device 16.

According to the optical communication system 1 of the fifth embodiment configured as described above, the number of wires required for return in each of the optical distribution units 30*a* and 40*a* can be suppressed even in the configuration including the N×M wavelength selective switches 33 and 43 instead of the optical SWs as the optical distribution units. Therefore, each subscriber device can be connected to an arbitrary subscriber device at an arbitrary timing by using the number of return transmission lines smaller than before.

First Modification Example of Fifth Embodiment

Figure 12:
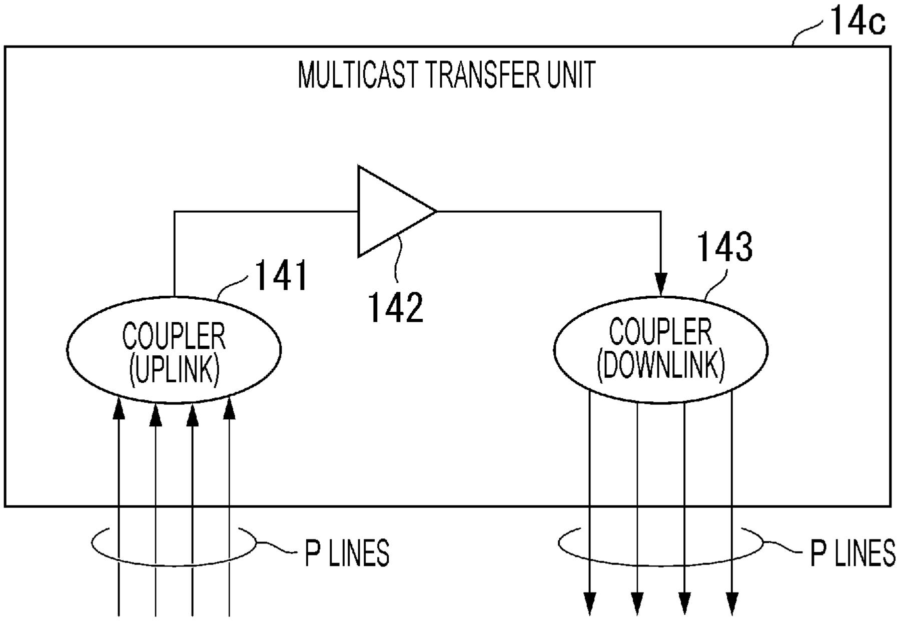
FIG. 12 is a block diagram illustrating a specific example of a (first) functional configuration of a multicast transfer unit according to a modification example of the fifth embodiment.
Figure 13:
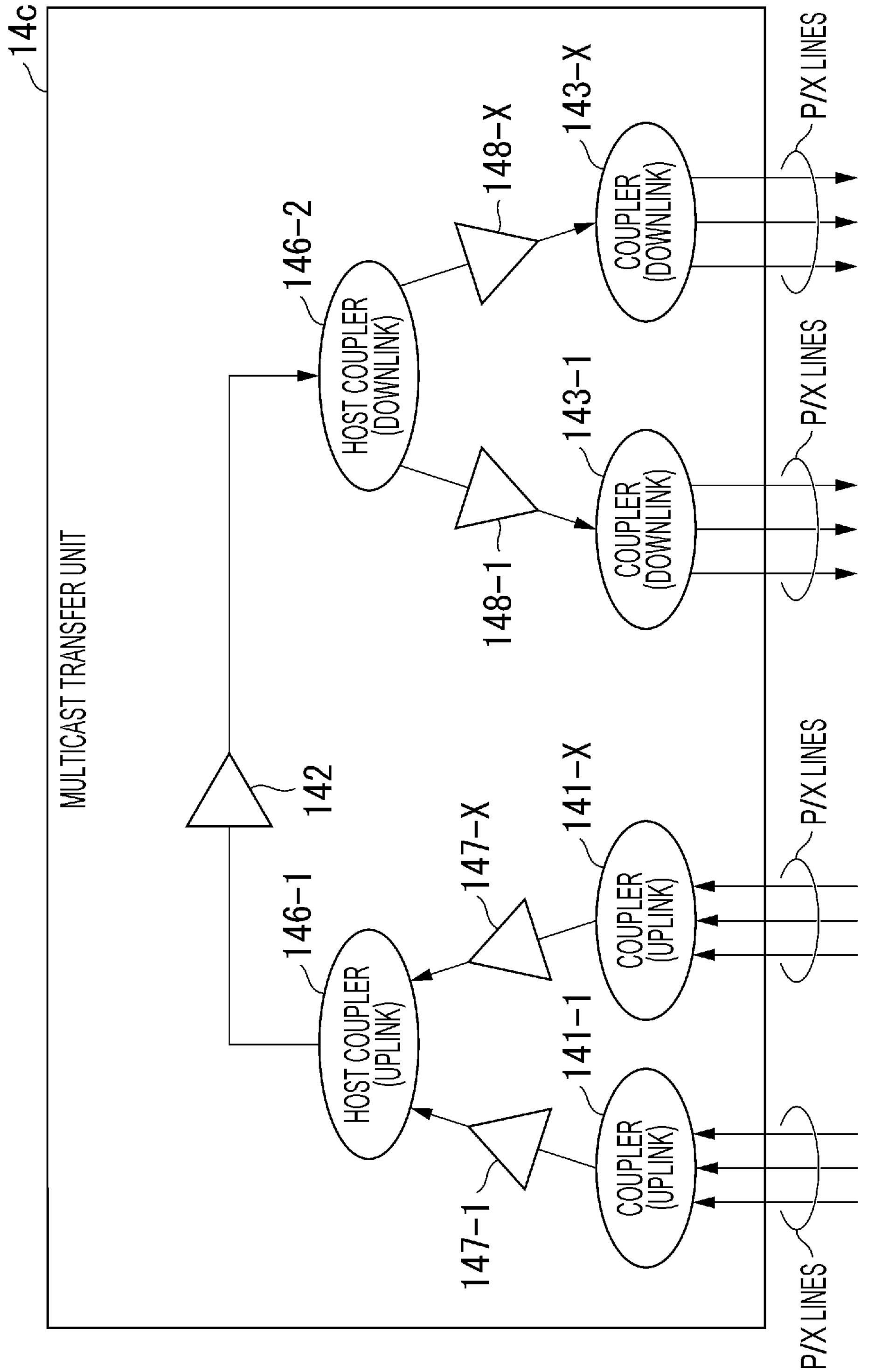
FIG. 13 is a block diagram illustrating a specific example of a (second) functional configuration of the multicast transfer unit according to the modification example of the fifth embodiment.
Figure 14:
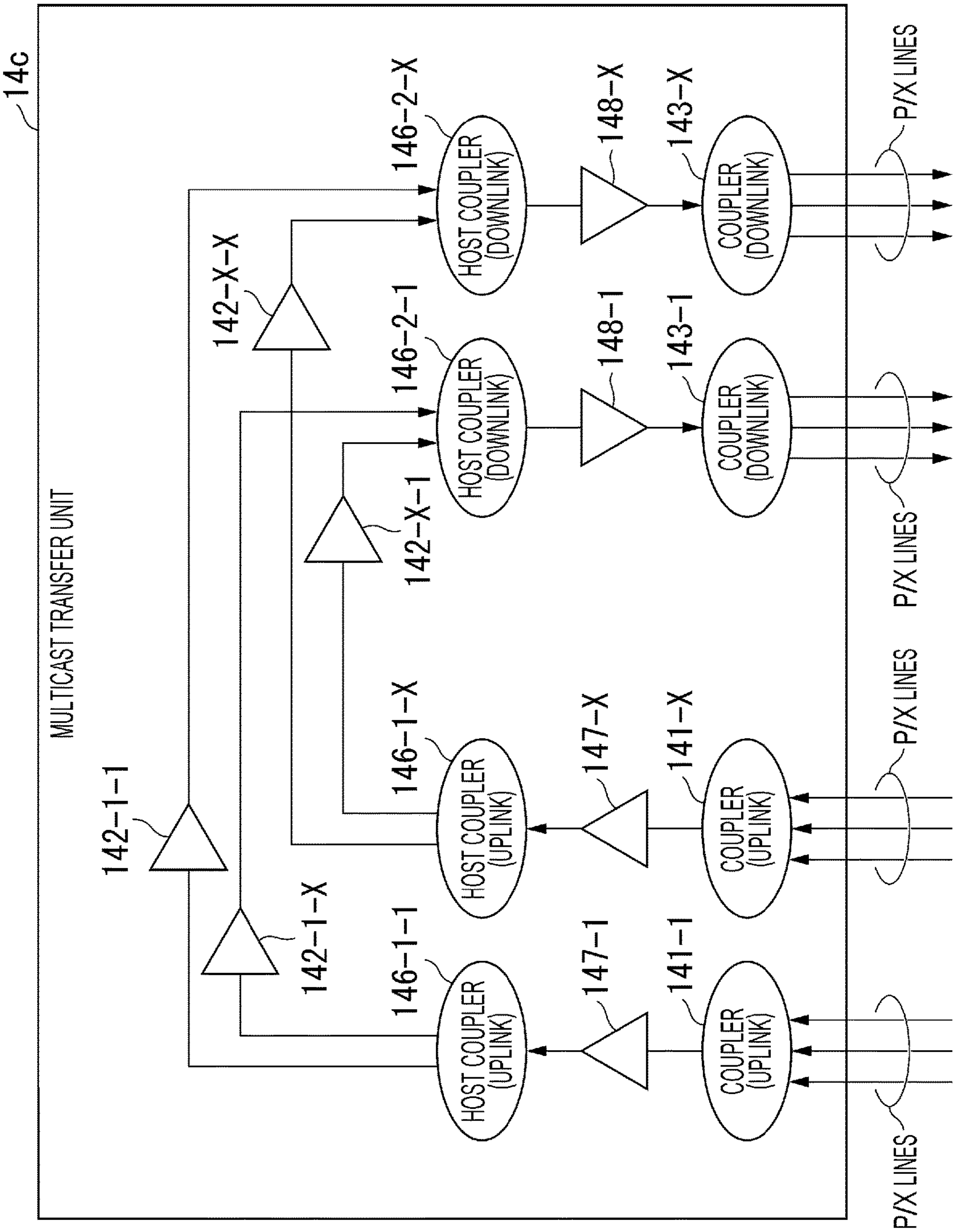
FIG. 14 is a block diagram illustrating a specific example of a (third) functional configuration of the multicast transfer unit according to the modification example of the fifth embodiment.

In a case where the optical distribution unit 30*a* includes the N×M wavelength selective switch 33 and the optical distribution unit 40*a* includes the N×M wavelength selective switch 43 as in the fifth embodiment, the multicast transfer unit 14 may have a configuration of any of FIGS. 12 to 14. The configurations of the multicast transfer unit 14 of FIGS. 12 to 14 include components having no wavelength dependency on the ports.

In a case where the optical distribution unit 30*a* includes the N×M wavelength selective switch 33, a plurality of optical signals can be multiplexed in the optical distribution unit 30*a* and be then input to the multicast transfer unit 14. Therefore, each N×M wavelength selective switch 33 only needs to be connected to the multicast transfer unit 14 via one optical transmission line, and, in a case where P N×M wavelength selective switches 33 are provided, P optical transmission lines are connected to the multicast transfer unit 14.

FIG. 12 is a block diagram illustrating a specific example of a (first) functional configuration of a multicast transfer unit 14*c* according to a modification example of the fifth embodiment. The multicast transfer unit 14*c* includes the coupler 141, the amplifier 142, and the coupler 143. The coupler 141 is connected to the P optical transmission lines connected to the respective optical distribution units 30*a* and receives an optical signal transmitted via any of the P optical transmission lines as an input. The coupler 141 multiplexes the input optical signals and outputs the multiplexed optical signal. The number of ports required for the coupler 141 is P.

The amplifier 142 amplifies the optical signal output from the coupler 141.

The coupler 143 splits the optical signal amplified by the amplifier 142 and outputs the split optical signals. The number of ports required for the coupler 143 is P. The optical signals split and output by the coupler 143 are input to the N×M wavelength selective switch 43 of each optical distribution unit 40*a* via the P optical transmission lines. Even in a case where the optical signals input from the multicast transfer unit 14 to each N×M wavelength selective switch 43 are wavelength multiplexed signals, the wavelength multiplexed signals can be separated by each N x M wavelength selective switch 43.

With such a configuration, even in a case where a component having wavelength selectivity such as WSS or AWG is not provided in the multicast transfer unit 14, multicast communication can be performed between arbitrary users.

FIG. 13 is a block diagram illustrating a specific example of a (second) functional configuration of the multicast transfer unit 14*c* according to the modification example of the fifth embodiment. The multicast transfer unit 14*c* includes the plurality of couplers 141-1 to 141-X, the amplifier 142, the plurality of couplers 143-1 to 143-X, the plurality of host couplers 146-1 and 146-2, the plurality of amplifiers 147-1 to 147-X, and the plurality of amplifiers 148-1 to 148-X.

In the example of FIG. 13, the coupler 141-*x* (1≤x≤X) is connected to the host coupler 146-1 via the amplifier 147-*x*, the coupler 143-*x* is connected to the host coupler 146-2 via the amplifier 148-*x*, and the host coupler 146-1 and the host coupler 146-2 are connected via the amplifier 142.

The coupler 141-*x* is connected to different P/X optical transmission lines among the P optical transmission lines connected to each optical distribution unit 30*a* and receives an optical signal transmitted via any of the P/X optical transmission lines as an input. The coupler 141-*x* multiplexes the input optical signals and outputs the multiplexed optical signal. In this manner, approximately the same number of optical transmission lines is connected to each coupler 141 on average. For example, in a case where the number of couplers 141 is two (X=2) and the number of optical distribution units 30*a* is four (P=4), two different optical transmission lines are connected to each coupler 141.

The amplifier 147-*x* amplifies the optical signal output from the coupler 141-*x*. The host coupler 146-1 multiplexes the optical signals amplified by the respective amplifiers 147 and outputs the multiplexed optical signal. The host coupler 146-2 splits the optical signal output from the host coupler 146-1 and amplified by the amplifier 142.

The amplifier 148-*x* amplifies the optical signal output from the host coupler 146-2. The coupler 143-*x* splits the optical signal amplified by the amplifier 148-*x* and outputs the split optical signals. The number of ports required for the coupler 143-*x* is P/X. The optical signals split and output by the coupler 143-*x* are input to the N×M wavelength selective switch 43 of each optical distribution unit 40*a* via the P/X optical transmission lines. Even in a case where the optical signals input from the multicast transfer unit 14 to each N×M wavelength selective switch 43 are wavelength multiplexed signals, the wavelength multiplexed signals can be separated by each N x M wavelength selective switch 43.

With such a configuration, even in a case where a component having wavelength selectivity such as WSS or AWG is not provided in the multicast transfer unit 14, multicast communication can be performed between arbitrary users.

FIG. 14 is a block diagram illustrating a specific example of a (third) functional configuration of the multicast transfer unit 14*c* according to the modification example of the fifth embodiment. The multicast transfer unit 14*c* includes the plurality of couplers 141-1 to 141-X, the plurality of amplifiers 142-1-1 to 142-X-X, the plurality of couplers 143-1 to 143-X, the plurality of host couplers 146-1-1 to 146-1-X, the plurality of host couplers 146-2-1 to 146-2-X, the plurality of amplifiers 147-1 to 147-X, and the plurality of amplifiers 148-1 to 148-X.

In the example of FIG. 14, the coupler 141-*x* is connected to the host coupler 146-1-*x* via the amplifier 147-*x*, the coupler 143-*x* is connected to the host coupler 146-2-*x* via the amplifier 148-*x*, and the host couplers 146-1 and the host couplers 146-2 are connected via the amplifiers 142.

The coupler 141-*x* is connected to different P/X optical transmission lines among the P optical transmission lines connected to each optical distribution unit 30*a* and receives an optical signal transmitted via any of the P/X optical transmission lines as an input. The coupler 141-*x* multiplexes the input optical signals and outputs the multiplexed optical signal.

The amplifier 147-*x* amplifies the optical signal output from the coupler 141-*x*. The host coupler 146-1-*x* splits the optical signal amplified by the amplifier 147-*x* and outputs the split optical signals. The host coupler 146-2-*x* multiplexes the optical signals output from the respective host couplers 146-1 and amplified by the connected amplifiers 142.

The amplifier 148-*x* amplifies the optical signal output from the host coupler 146-2-*x*. The coupler 143-*x* splits the optical signal amplified by the amplifier 148-*x* and outputs the split optical signals. The number of ports required for the coupler 143-*x* is P/X. The optical signals split and output by the coupler 143-*x* are input to the N×M wavelength selective switch 43 of each optical distribution unit 40*a* via the P/X optical transmission lines. Even in a case where the optical signals input from the multicast transfer unit 14 to each N×M wavelength selective switch 43 are wavelength multiplexed signals, the wavelength multiplexed signals can be separated by each N x M wavelength selective switch 43.

With such a configuration, even in a case where a component having wavelength selectivity such as WSS or AWG is not provided in the multicast transfer unit 14, multicast communication can be performed between arbitrary users.

Second Modification Example of Fifth Embodiment

In the above embodiment, the configuration in which one optical communication device includes the optical distribution units 30*a*, the optical distribution units 40*a*, and the multicast transfer unit 14 has been described. Any of the optical distribution units 30*a*, the optical distribution units 40*a*, and the multicast transfer unit 14 may be mounted on another device. The same applies to a case where the multicast transfer unit 14 is the multicast transfer unit 14*a* or 14*b*.

Sixth Embodiment

In a sixth embodiment, the uplink optical distribution unit and the downlink optical distribution unit different from those of the first to fifth embodiments will be described. The sixth embodiment is similar to the first embodiment in the system configuration of the optical communication system 1, except for the configuration of the optical distribution unit. Therefore, hereinafter, differences from the first embodiment will be described.

Figure 15:
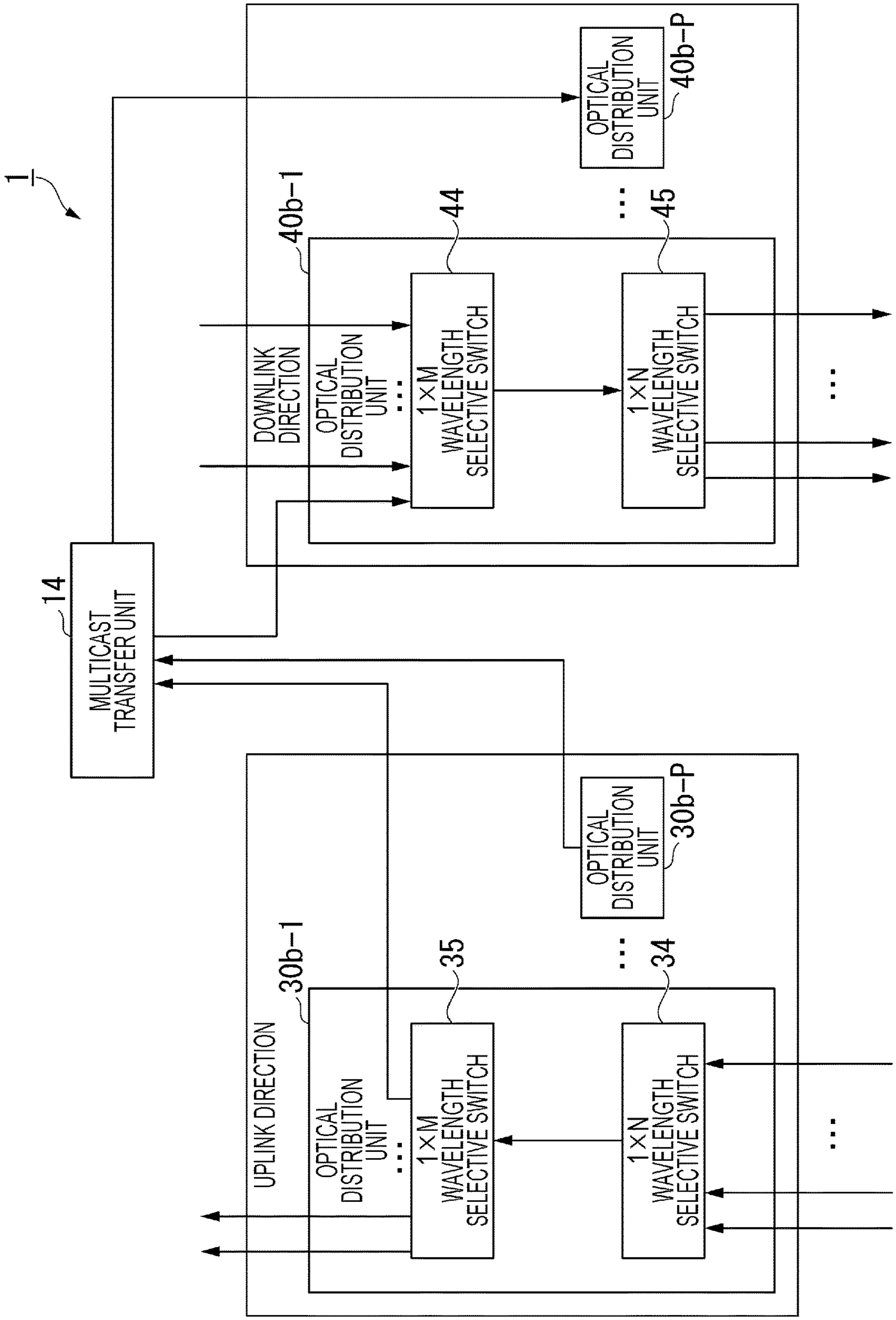
FIG. 15 is a configuration diagram of an optical communication system according to a sixth embodiment.
Figure 16:
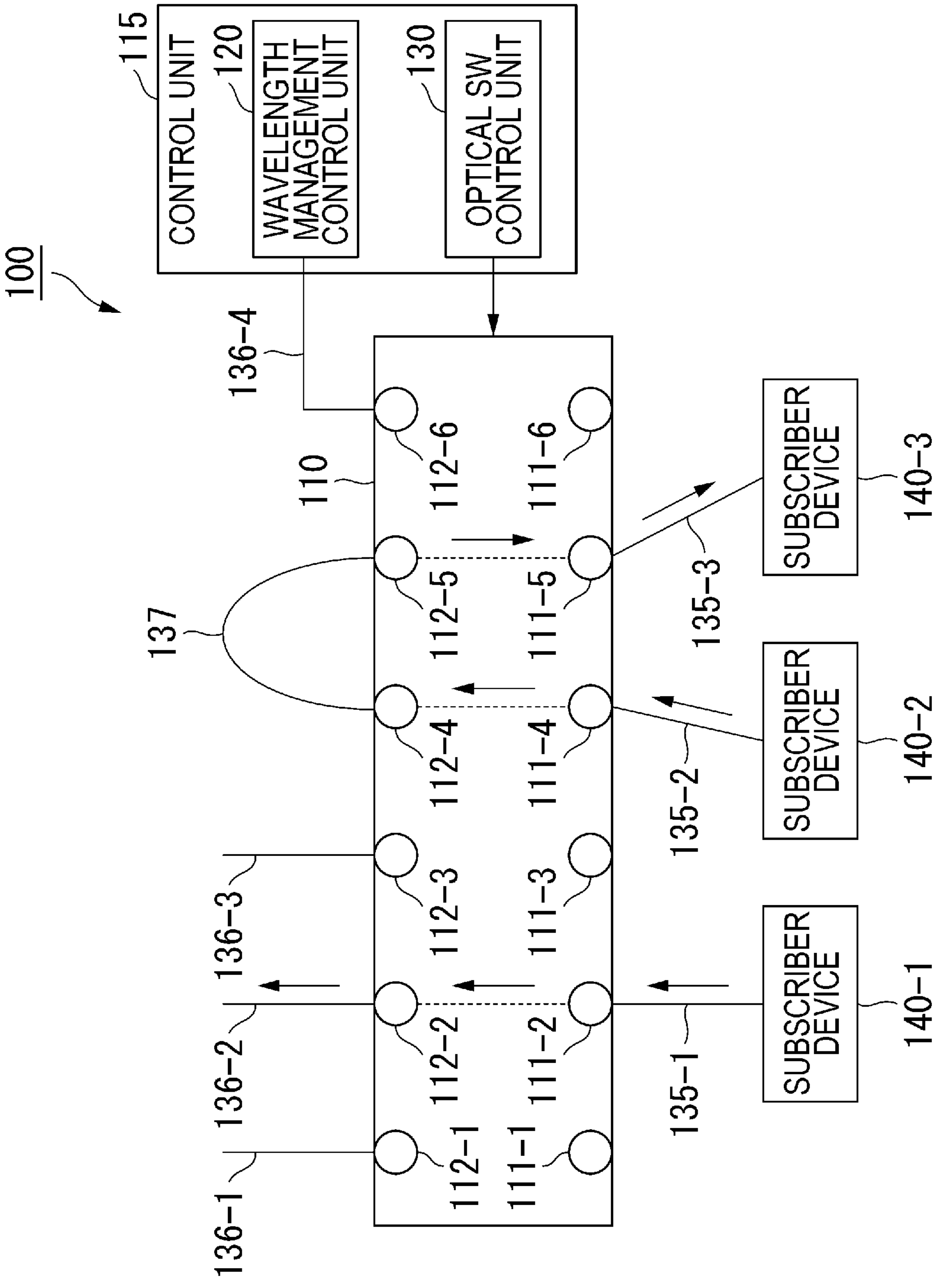
FIG. 16 illustrates a configuration example of an optical communication system including a conventional optical communication device.
Figure 17:
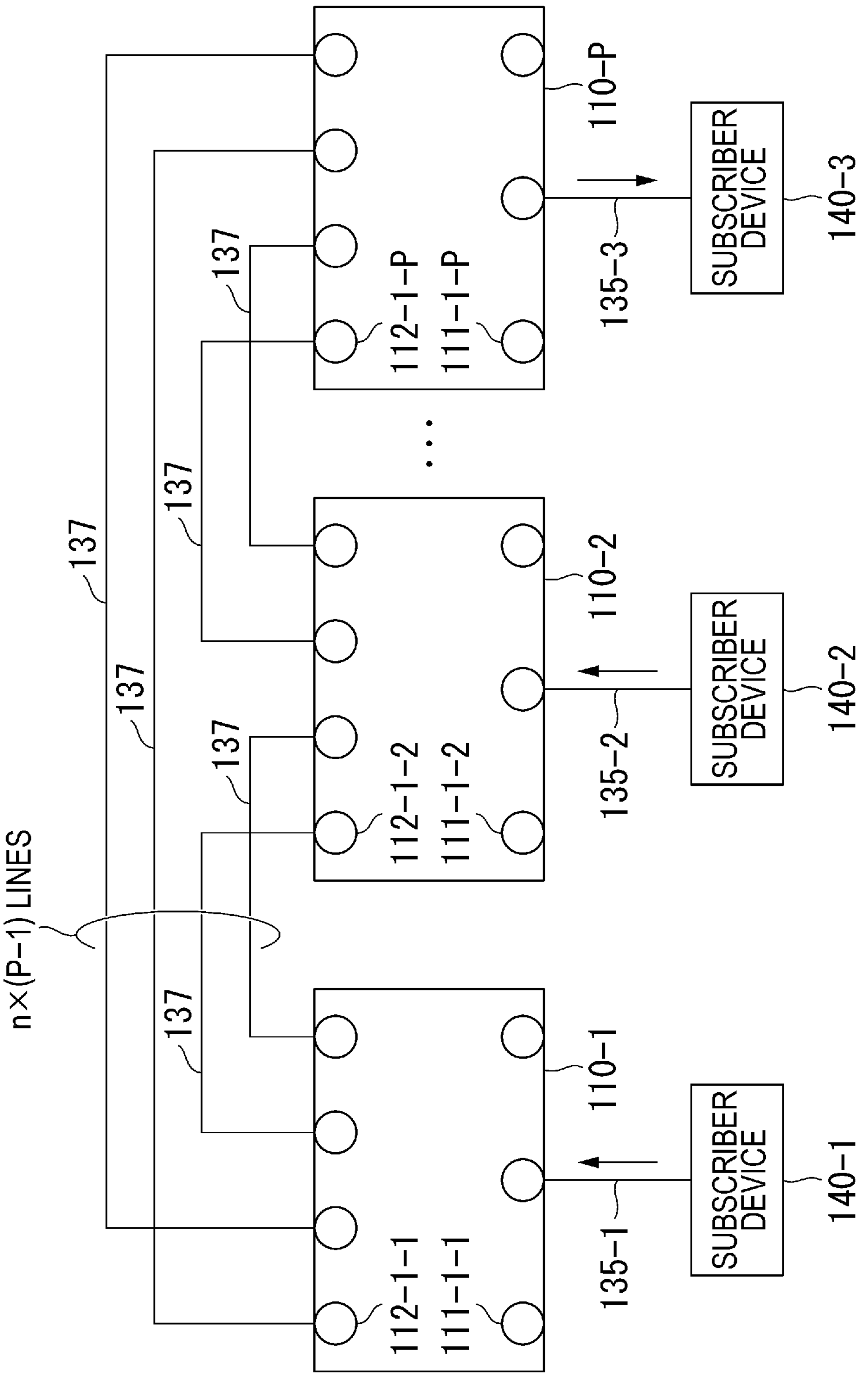
FIG. 17 is an explanatory diagram of a configuration in which a plurality of optical SWs is arranged in parallel.

FIG. 15 is a configuration diagram of the optical communication system 1 according to the sixth embodiment. The optical communication system 1 according to the sixth embodiment includes P optical distribution units 30*b*-1 to 30*b*-P, P optical distribution units 40*b*-1 to 40*b*-P, the control unit 12 (not illustrated), and the multicast transfer unit 14.

Hereinafter, description will be made on the assumption that the optical distribution units 30*b*-1 to 30*b*-P are used for transmitting optical signals in the uplink direction and that the optical distribution units 40*b*-1 to 40*b*-P are used for transmitting optical signals in the downlink direction.

The optical distribution units 30*b*-1 to 30*b*-P have the same configuration. The optical distribution units 40*b*-1 to 40*b*-P have the same configuration. In the following description, the optical distribution units 30*b*-1 to 30*b*-P will be simply referred to as the optical distribution units 30*b* when not distinguished, and the optical distribution units 40*b*-1 to 40*b*-P will be simply referred to as the optical distribution units 40*b* when not distinguished. The optical distribution units 30*b*, the optical distribution units 40*b*, the control unit 12, and the multicast transfer unit 14 are functional units forming one optical communication device.

The optical distribution unit 30*b* includes one or more 1×N wavelength selective switches 34 and one or more 1×M wavelength selective switches 35. The optical distribution unit 30*b* is one aspect of the first optical distribution unit. The 1×N wavelength selective switch 34 and the 1×M wavelength selective switch 35 are connected to a plurality of optical transmission lines and output an optical signal input from any of the optical transmission lines to another optical transmission line. The 1×N wavelength selective switch 34 has N first ports and one second port. The N first ports included in the 1×N wavelength selective switch 34 are connected to the edge node 15 or the subscriber device 16 via optical transmission lines. The one second port included in the 1×N wavelength selective switch 34 is connected to the 1×M wavelength selective switch 35 via an optical transmission line. The 1×N wavelength selective switch 34 is a WSS.

The 1×M wavelength selective switch 35 has one first port and M second ports. The one first port included in the 1×M wavelength selective switch 35 is connected to the 1×N wavelength selective switch 34 via the optical transmission line. One of the M second ports included in the 1×M wavelength selective switch 35 is connected to the multicast transfer unit 14 via an optical transmission line. The remaining second ports (e.g. (M-1) second ports) of the M second ports included in the 1×M wavelength selective switch 35 are connected to another device via optical transmission lines, respectively. The 1×M wavelength selective switch 35 is a WSS.

The optical distribution unit 40*b* includes one or more 1×M wavelength selective switches 44 and one or more 1×N wavelength selective switches 45. The optical distribution unit 40*b* is one aspect of the second optical distribution unit. The 1×M wavelength selective switch 44 and the 1×N wavelength selective switch 45 are connected to a plurality of optical transmission lines and output an optical signal input from any of the optical transmission lines to another optical transmission line. The 1×M wavelength selective switch 44 has one first port and M second ports. The one first port included in the 1×M wavelength selective switch 44 is connected to the 1×N wavelength selective switch 45 via an optical transmission line.

One of the M second ports included in the 1×M wavelength selective switch 44 is connected to the multicast transfer unit 14 via an optical transmission line. The remaining second ports (e.g. (M-1) second ports) of the M second ports included in the 1×M wavelength selective switch 44 are connected to another device via optical transmission lines, respectively. The 1×M wavelength selective switch 44 is a WSS.

The 1×N wavelength selective switch 45 has N first ports and one second port. The N first ports included in the 1×N wavelength selective switch 45 are connected to the subscriber device 16 via optical transmission lines. The one second port included in the 1×N wavelength selective switch 45 is connected to the 1×M wavelength selective switch 44 via the optical transmission line. The 1×N wavelength selective switch 45 is a WSS.

An amplifier may be installed to compensate for a signal loss. A place where the amplifier may be installed is any or all of the transmission line of the first port of each of the 1×N wavelength selective switches 34 and 45, the transmission line between the 1×N wavelength selective switch 34 and the 1×M wavelength selective switch 35, the transmission line between the 1×M wavelength selective switch 44 and the 1×N wavelength selective switch 45, and the transmission line of the second port of each of the 1×M wavelength selective switches 35 and 44.

The multicast transfer unit 14 receives an optical signal output from each 1×M wavelength selective switch 35 as an input and performs multicast transfer of the input optical signal to at least each 1×M wavelength selective switch 44 to which a destination subscriber device 16 is connected. One optical transmission line is connected to the multicast transfer unit 14 from one 1×M wavelength selective switch 35. Therefore, one optical transmission line is connected from one optical distribution unit 30*b* to the multicast transfer unit 14, and the number of optical distribution units 30*b* is P, and thus P uplink optical transmission lines are connected to the multicast transfer unit 14. Further, one optical transmission line is connected from one optical distribution unit 40*b* to the multicast transfer unit 14, and the number of optical distribution units 40*b* is P, and thus P downlink optical transmission lines are connected to the multicast transfer unit 14.

In a case where multicast communication is performed across the optical distribution unit 30*b*, the optical SW control unit 122 switches a path between the ports of the 1×N wavelength selective switch 34 and the 1×M wavelength selective switch 35 included in the optical distribution unit 30*b* so as to connect an output destination of an optical signal from the optical distribution unit 30*b* to the multicast transfer unit 14. The multicast transfer unit 14 performs control such that the input optical signal is output to a desired optical distribution unit 40*b*. With this configuration, return communication between arbitrary optical distribution units is implemented while the number of wires required for return in each optical distribution unit 40*b* is suppressed to P.

The configuration of the multicast transfer unit 14 may be any of the configurations described in the first to third embodiments. That is, the configuration of the multicast transfer unit 14 may be any of the configurations of FIGS. 2 and 4 to 7.

In the sixth embodiment, the optical SW control unit 122 switches connection between the ports of each of the 1×N wavelength selective switches 34 and 45 and connection between the ports of each of the 1×M wavelength selective switches 35 and 44. Specifically, in the sixth embodiment, the optical SW control unit 122 switches the connection between the ports for each of the 1×N wavelength selective switch 34 and the 1×M wavelength selective switch 35 included in each optical distribution unit 30*b* and the connection between the ports for each of the 1×M wavelength selective switch 44 and the 1×N wavelength selective switch 45 included in each optical distribution unit 40*b*.

For example, the optical SW control unit 122 switches the connection between the ports of the 1×N wavelength selective switch 34 and the 1×M wavelength selective switch 35 so as to connect the first port and the second port of the 1×N wavelength selective switch 34 to which the edge node 15 or the subscriber device 16 serving as a transmission target is connected and connect the first port of the 1×M wavelength selective switch 35 and the second port to which the multicast transfer unit 14 is connected. The 1×N wavelength selective switch 34 outputs, from the second port, an optical signal transmitted from the edge node 15 or the subscriber device 16 connected to the first port. The optical signal output from the 1×N wavelength selective switch 34 is input to the first port of the 1×M wavelength selective switch 35. The 1×M wavelength selective switch 35 outputs the optical signal input to the first port from the second port connected to the multicast transfer unit 14. Therefore, the optical signal input to the optical distribution unit 30*b* is transferred to the multicast transfer unit 14.

Further, the optical SW control unit 122 switches the connection between the ports of the 1×M wavelength selective switch 44 and the 1×N wavelength selective switch 45 so as to connect the first port of the 1×M wavelength selective switch 44 and the second port of the 1×M wavelength selective switch 44 to which the multicast transfer unit 14 is connected and connect the second port of the 1×N wavelength selective switch 45 and the first port to which a destination subscriber device 16 is connected. The optical signal transferred from the multicast transfer unit 14 is input to the second port of the 1×M wavelength selective switch 44. The 1×M wavelength selective switch 44 outputs, from the first port, the optical signal transferred from the multicast transfer unit 14 and input to the second port. The optical signal output from the 1×M wavelength selective switch 44 is input to the second port of the 1×N wavelength selective switch 45. The 1×N wavelength selective switch 45 outputs the optical signal input to the second port from the first port to which the destination subscriber device 16 is connected. Therefore, the optical signal output from the multicast transfer unit 14 is transferred to the destination subscriber device 16.

According to the optical communication system 1 of the sixth embodiment configured as described above, the number of wires required for return in each of the optical distribution units 30*b* and 40*b* can be suppressed even in the configuration including the 1×N wavelength selective switch and the 1×M wavelength selective switch in combination, instead of the optical SW as the optical distribution unit. Therefore, each subscriber device can be connected to an arbitrary subscriber device at an arbitrary timing by using the number of return transmission lines smaller than before.

First Modification Example of Sixth Embodiment

In a case where the optical distribution unit 30*b* includes the 1×N wavelength selective switch 34 and the 1×M wavelength selective switch 35 and the optical distribution unit 40*b* includes the 1×M wavelength selective switch 44 and the 1×N wavelength selective switch 45 as in the sixth embodiment, the multicast transfer unit 14 may have the configuration of any of FIGS. 12 to 14.

Second Modification Example of Sixth Embodiment

Any or all of the 1×N wavelength selective switches 34 and 45 and the 1×M wavelength selective switches 35 and 44 may be couplers.

Third Modification Example of Sixth Embodiment

In the above embodiment, the configuration in which one optical communication device includes the optical distribution units 30*b*, the optical distribution units 40*b*, and the multicast transfer unit 14 has been described. Any of the optical distribution units 30*b*, the optical distribution units 40*b*, and the multicast transfer unit 14 may be mounted on another device. The same applies to a case where the multicast transfer unit 14 is the multicast transfer unit 14*a* or 14*b*.

Modification Examples of First to Third Embodiments

In each of the above embodiments, the optical SWs are separately used in the uplink direction and in the downlink direction, but the same optical SWs may be used in the uplink direction and in the downlink direction.

In each of the above embodiments, the configuration in which the optical SWs 10, the optical SWs 11, and the multicast transfer unit 14, 14*a*, or 14*b* are provided in one optical communication device has been described. Any one of the optical SWs 10, the optical SWs 11, and the multicast transfer unit 14, 14*a*, or 14*b* may be mounted on another device.

Some functional units (e.g. the control unit 12 and the multicast transfer unit 14, 14*a*, 14*b*, or 14*c*) included in the optical communication device in the above embodiments may be implemented by a computer. In that case, a program for implementing this function may be recorded in a computer-readable recording medium, and the program recorded in the recording medium may be read and executed by a computer system to implement the function. Note that the "computer system" herein includes an OS and hardware such as peripheral devices.

The "computer-readable recording medium" refers to a portable medium such as a flexible disk, a magneto-optical disc, a ROM, or a CD-ROM or a storage device such as a hard disk included in the computer system. Further, the "computer-readable recording medium" may include a medium that dynamically holds the program for a short time, such as a communication line in a case where the program is transmitted via a network such as the Internet or a communication line such as a telephone line, and a medium that holds the program for a certain period of time, such as a volatile memory inside the computer system serving as a server or a client in that case. The above program may be for implementing some of the functions described above, may implement the functions described above by a combination with a program already recorded in the computer system, or may be implemented by using a programmable logic device such as an FPGA.

As described above, the embodiments of the present invention have been described in detail with reference to the drawings. However, specific configurations are not limited to the embodiments and include design and the like within the scope of the present invention.

INDUSTRIAL APPLICABILITY

The present invention is applicable to an optical communication system technique that performs return communication via an optical distribution unit.

REFERENCE SIGNS LIST

10-1 to 10-P, 11-1 to 11-P Optical SW
12 Control unit

121 Wavelength management control unit
122 Optical SW control unit
14, 14*a*, 14*b* Multicast transfer unit
15 Edge node
16-1 to 16-3 Subscriber device
30, 30-1 to 30-P, 30*a*, 30*a*-1 to 30*a*-P, 30*b*, 30*b*-1 to 30*b*-P, 40, 40-1 to 40-P, 40*a*, 40*a*-1 to 40*a*-P,
40*b*, 40*b*-1 to 40*b*-P Optical distribution unit
31,42 1×M optical switch
32 Signal multiplexing unit
33, 43 N×M wavelength selective switch
34, 45 1×N wavelength selective switch
35, 44 1×M wavelength selective switch
41 Signal separation unit
141, 141-1 to 141-X, 143, 143-1 to 143-X Coupler
142, 142-1-1 to 142-X-X, 147-1 to 147-X, 148-1 to 148-X, 148-1 to 148-P Amplifier
144, 144*a*, 144*b* Transfer wavelength control unit
145-1 to 145-nP Wavelength-tunable filter
146-1, 146-2, 146-1-1 to 146-1-X, 146-2-1 to 146-2-X Host coupler
149-1 to 149-P, 149-1 to 149-X WSS

The invention claimed is:

1. An optical communication device comprising:

a plurality of first distributors that is connected to a plurality of optical transmission lines and outputs an optical signal input from any of first devices to any of the optical transmission lines;

a plurality of second distributors that is connected to a plurality of optical transmission lines and outputs an optical signal input from any of the optical transmission lines to any of second devices; and a multicast transferer configured to perform multicast transfer of the optical signal transmitted from the first device connected to any of the plurality of first distributors to any of the plurality of second distributors connected to the one or more second devices, wherein the multicast transferer comprises a combination of a plurality of multiplexers/demultiplexers that combine or split one or more optical signals input, wherein:

each of the plurality of first distributors includes a plurality of first optical switches and a plurality of signal multiplexers;

each of the plurality of second distributors includes a plurality of second optical switches and a plurality of signal separators;

each of the plurality of first optical switches includes one first port to which the first device is connected and a plurality of second ports to which each of the plurality of signal multiplexers is connected, at least one of the plurality of second ports being connected to the multicast transferer; and each of the plurality of second optical switches includes one first port to which the second device is connected and a plurality of second ports to which each of the plurality of signal separators is connected, at least one of the plurality of second ports being connected to the multicast transferer, or, wherein:

each of the plurality of first distributors includes a plurality of first optical switches and a plurality of signal multiplexers;

each of the plurality of second distributors includes a plurality of second optical switches and a plurality of signal separators;

each of the plurality of first optical switches includes one first port to which the first device is connected and a plurality of second ports to which each of the plurality of signal multiplexers is connected;

each of the plurality of second optical switches includes one first port to which the second device is connected and a plurality of second ports to which each of the plurality of signal separators is connected;

at least one of the plurality of signal multiplexers is connected to the multicast transferer; and at least one of the plurality of signal separators is connected to the multicast transferer.

2. An optical communication system comprising:

a plurality of first distributors that is connected to a plurality of optical transmission lines and outputs an optical signal input from any of first devices to any of the optical transmission lines;

a plurality of second distributors that is connected to a plurality of optical transmission lines and outputs an optical signal input from any of the optical transmission lines to any of second devices; and a multicast transferer configured to transfer the optical signal transmitted from the first device connected to any of the plurality of first distributors to any of the plurality of second distributors connected to the specific second device, wherein the multicast transferer comprises a combination of a plurality of multiplexers/demultiplexers that combine or split one or more optical signals input, wherein:

each of the plurality of first distributors includes a plurality of first optical switches and a plurality of signal multiplexers;

each of the plurality of second distributors includes a plurality of second optical switches and a plurality of signal separators;

each of the plurality of first optical switches includes one first port to which the first device is connected and a plurality of second ports to which each of the plurality of signal multiplexers is connected, at least one of the plurality of second ports being connected to the multicast transferer; and each of the plurality of second optical switches includes one first port to which the second device is connected and a plurality of second ports to which each of the plurality of signal separators is connected, at least one of the plurality of second ports being connected to the multicast transferer, or, wherein:

each of the plurality of first distributors includes a plurality of first optical switches and a plurality of signal multiplexers;

each of the plurality of second distributors includes a plurality of second optical switches and a plurality of signal separators;

each of the plurality of first optical switches includes one first port to which the first device is connected and a plurality of second ports to which each of the plurality of signal multiplexers is connected;

each of the plurality of second optical switches includes one first port to which the second device is connected and a plurality of second ports to which each of the plurality of signal separators is connected;

at least one of the plurality of signal multiplexers is connected to the multicast transferer; and at least one of the plurality of signal separators is connected to the multicast transferer.

3. A transfer method comprising:

causing a plurality of first distributors connected to a plurality of optical transmission lines to output an optical signal input from any of first devices to any of the optical transmission lines;

causing a plurality of second distributors connected to a plurality of optical transmission lines to output an optical signal input from any of the optical transmission lines to any of second devices; and transferring, by a multicast transferer, the optical signal transmitted from the first device connected to any of the plurality of first distributors to any of the plurality of second distributors connected to the specific second device, wherein the multicast transferer comprises a combination of a plurality of multiplexers/demultiplexers that combine or split one or more optical signals input, wherein:

each of the plurality of first distributors includes a plurality of first optical switches and a plurality of signal multiplexers;

each of the plurality of second distributors includes a plurality of second optical switches and a plurality of signal separators;

each of the plurality of first optical switches includes one first port to which the first device is connected and a plurality of second ports to which each of the plurality of signal multiplexers is connected, at least one of the plurality of second ports being connected to the multicast transferer; and each of the plurality of second optical switches includes one first port to which the second device is connected and a plurality of second ports to which each of the plurality of signal separators is connected, at least one of the plurality of second ports being connected to the multicast transferer, or, wherein:

each of the plurality of first distributors includes a plurality of first optical switches and a plurality of signal multiplexers;

each of the plurality of second distributors includes a plurality of second optical switches and a plurality of signal separators;

each of the plurality of first optical switches includes one first port to which the first device is connected and a plurality of second ports to which each of the plurality of signal multiplexers is connected;

each of the plurality of second optical switches includes one first port to which the second device is connected and a plurality of second ports to which each of the plurality of signal separators is connected;

at least one of the plurality of signal multiplexers is connected to the multicast transferer; and at least one of the plurality of signal separators is connected to the multicast transferer.

* * * * *